US012630410B2

(12) United States Patent
Callaghan et al.

(10) Patent No.: US 12,630,410 B2
(45) Date of Patent: May 19, 2026

(54) TOOGLE DEVICE

(71) Applicants: Gillian Callaghan, Vero Beach, FL (US); John Newton, Sebastian, FL (US); Jacob Lockwood, Vero Beach, FL (US); Michael Cheney, Vero Beach, FL (US); Dustin Hartsfield, Sebastian, FL (US); Rory Pawl, Vero Beach, FL (US)

(72) Inventors: Gillian Callaghan, Vero Beach, FL (US); John Newton, Sebastian, FL (US); Jacob Lockwood, Vero Beach, FL (US); Michael Cheney, Vero Beach, FL (US); Dustin Hartsfield, Sebastian, FL (US); Rory Pawl, Vero Beach, FL (US)

(73) Assignee: GATE CAV Solutions, Inc., Sebastian, FL (US)

( * ) Notice: Subject to any disclaimer, the term of this patent is extended or adjusted under 35 U.S.C. 154(b) by 0 days.

(21) Appl. No.: 18/123,307

(22) Filed: Mar. 19, 2023

(65) Prior Publication Data

US 2023/0294974 A1 Sep. 21, 2023

Related U.S. Application Data

(60) Provisional application No. 63/321,816, filed on Mar. 21, 2022.

(51) Int. Cl.
*B67D 1/12* (2006.01)
*B67D 1/00* (2006.01)

(52) U.S. Cl.
CPC ......... *B67D 1/1281* (2013.01); *B67D 1/0015* (2013.01); *B67D 2210/00144* (2013.01)

(58) Field of Classification Search
CPC .................... B67D 1/1218; B67D 2210/00144
See application file for complete search history.

(56) References Cited

U.S. PATENT DOCUMENTS

| | | | | |
|---|---|---|---|---|
| 5,255,819 A * | 10/1993 | Peckels | B67D 3/0051 | 222/37 |
| 2002/0170925 A1* | 11/2002 | Friedman | B67D 1/1281 | 222/129.1 |
| 2008/0088397 A1* | 4/2008 | Kretschmer | G05G 9/047 | 324/207.25 |
| 2018/0099851 A1* | 4/2018 | Newton | B67D 1/1252 | |
| 2019/0256339 A1* | 8/2019 | Cleland | B67D 1/0015 | |
| 2023/0183053 A1* | 6/2023 | Newton | B67D 1/1281 | 222/144.5 |
| 2024/0359964 A1* | 10/2024 | Thomas | B67D 3/0016 | |

* cited by examiner

*Primary Examiner* — Jeremy Carroll
(74) *Attorney, Agent, or Firm* — CF3; Stephen Eisenmann

(57) ABSTRACT

A dispensing device including: a valve with an inlet area, a throttle pin coupled to the inlet area, a diaphragm, a support structure, a spring, and an outlet area; a toggle which opens and seals the outlet area based on a position of the toggle; and where the diaphragm and the support structure are generate an open state and a closed state based on a threshold pressure in the inlet area.

11 Claims, 21 Drawing Sheets

TOOGLE DEVICE

REFERENCE TO RELATED APPLICATION

The present application claims priority to Provisional Patent Application No. 63/321,816 filed on Mar. 21, 2022, which is incorporated in its entirety by reference.

BACKGROUND DISCUSSION

The dispensing industry is becoming more complex based on customer demand for customized drinks. These customized drinks require precision applications of various liquids and gases. In addition, material cost, labor cost, and labor safety are important factors that need to be enhanced. By utilizing this disclosure, the operator can achieve customized, precision drinks with reduced material cost and labor cost while increase labor safety.

FIELD OF THE DISCLOSURE

This disclosure relates generally to liquid and/or gas delivery systems, and is concerned in particular with a system capable of delivering an on-demand customized mixture.

SUMMARY OF THE DISCLOSURE

In accordance with one aspect of the present disclosure, a liquid dispensing system includes one or more ingredients, fluids, liquids, and/or gases. In addition, one or more valves (e.g., CF Valve, CFIVE Valve) and one or more control devices (e.g., solenoid, toggle, magnet with blocking device, etc.) may be utilized.

DETAILED DESCRIPTION

Figure 1:
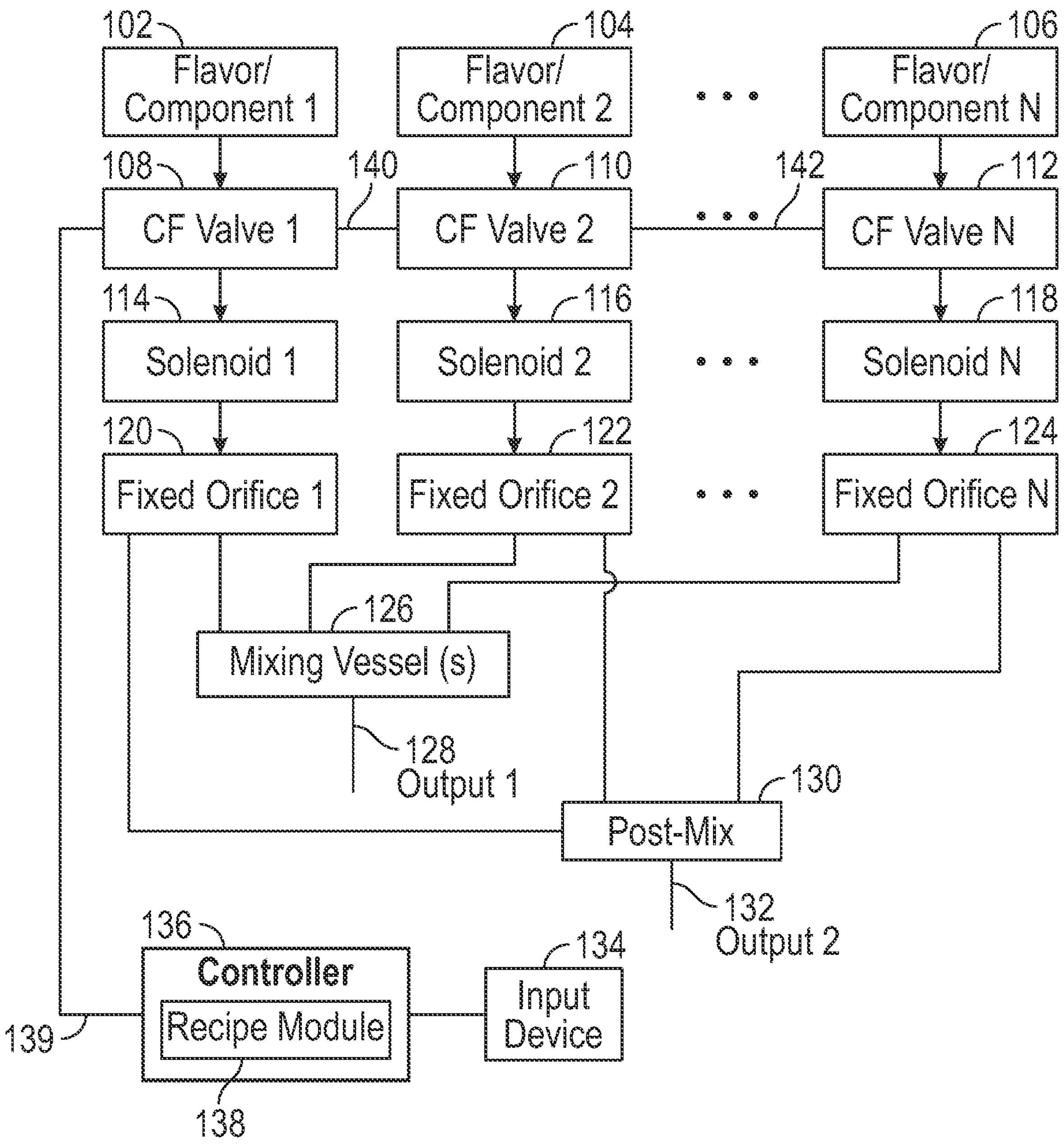
FIG. 1 is an illustration of an exemplary embodiment of a liquid delivery system, according to one embodiment.

In FIG. 1, an illustration of an exemplary embodiment of a liquid delivery system is shown, according to one embodiment. FIG. 1 shows a dispensing device 100 including a first flavor/component 102, a second flavor/component 104, an Nth flavor/component 106, a first CF Valve 108 (e.g., a CF Valve only, a CF Valve with a Solenoid (e.g., CFIVe), and/or any other type of valve in this disclosure), a second CF Valve 110, an Nth CF Valve 112, a first solenoid 114, a second solenoid 116, an Nth solenoid 118, a first fixed orifice 120, a second fixed orifice 122, an Nth fixed orifice 124, a mixing vessel(s) 126, an output of the mixing vessel(s) 128, a post-mix area 130, an output of the post-mix area 132, an input device 134, and/or a controller 136 with or without a recipe module 138.

In one example, the dispensing device is a recipe based system that is driven from a bank of two or more CFiVes (e.g., CF Valve and a Solenoid) that each represent a single fluid (liquid or gas) which then mix together to make a designated recipe. These can be pre-mix or post-mix (meaning they can mix in a manifold or vessel prior to dispense or mix at atmosphere at the point of dispense). In one example of a CF Valve application, the controlling orifice or flow insert after the outlet of the valve is changed in order to increase or decrease the total flow rate or amount poured. In contrast, the dispensing device 100 shown in FIG. 1, the flow rate is fixed with an orifice and the amount dispensed or mixed into the recipe is based on the "on time" designated in the recipe.

For example, if a CFiVe with a specific orifice and a specific fluid flows at 1 ounce per second is utilized but the recipe only calls for 0.50 ounces, then the controller for the CFiVes will turn the CFiVe on and off again at a 50% duty cycle rate during a one second time slot to achieve the 0.50 ounces per second. Conversely, if the recipe calls for 2 ounces the controller will turn the CFiVe on and leave it actuated/open for 2 seconds to get the desired 2 ounces. The same ingredient can be dosed in different amounts for different recipes based on the "time on" dictated by the controller.

In legacy dispensers that use PRVs, ceramics or other types of flow control valves this level of control is not possible—meaning that if you want several different flow rates/amounts with the same ingredient you may require several separate valves for each flow rate imagined.

In this example, the system, the controller, and/or computer for the system has recipes (which are either entered into the equipment via flash drive, IOT download, manually, etc.) and there is a "library" of ingredients and flow rates per second for each ingredient through the CFiVe and the orifice. The system controller can turn on and off the various CFiVes for each ingredient for the allotted amount of time during the pour in order to achieve the targeted amount of each ingredient for that particular recipe. The system can be updated with additional ingredients and/or additional recipes.

The benefits of this system is that there is no need to visit the store/restaurant/equipment in order to change orifices to update flow rates. With a simple recipe update via internet download, flash drive or manual entry—the system can now run that recipe (flow rate/quantity) for each ingredient. Furthermore, if new ingredients are introduced, still there is no need for a service visit to the equipment as the information for that new ingredient is updated in the system and the system can use that ingredient in the updated recipes.

Figure 2A:
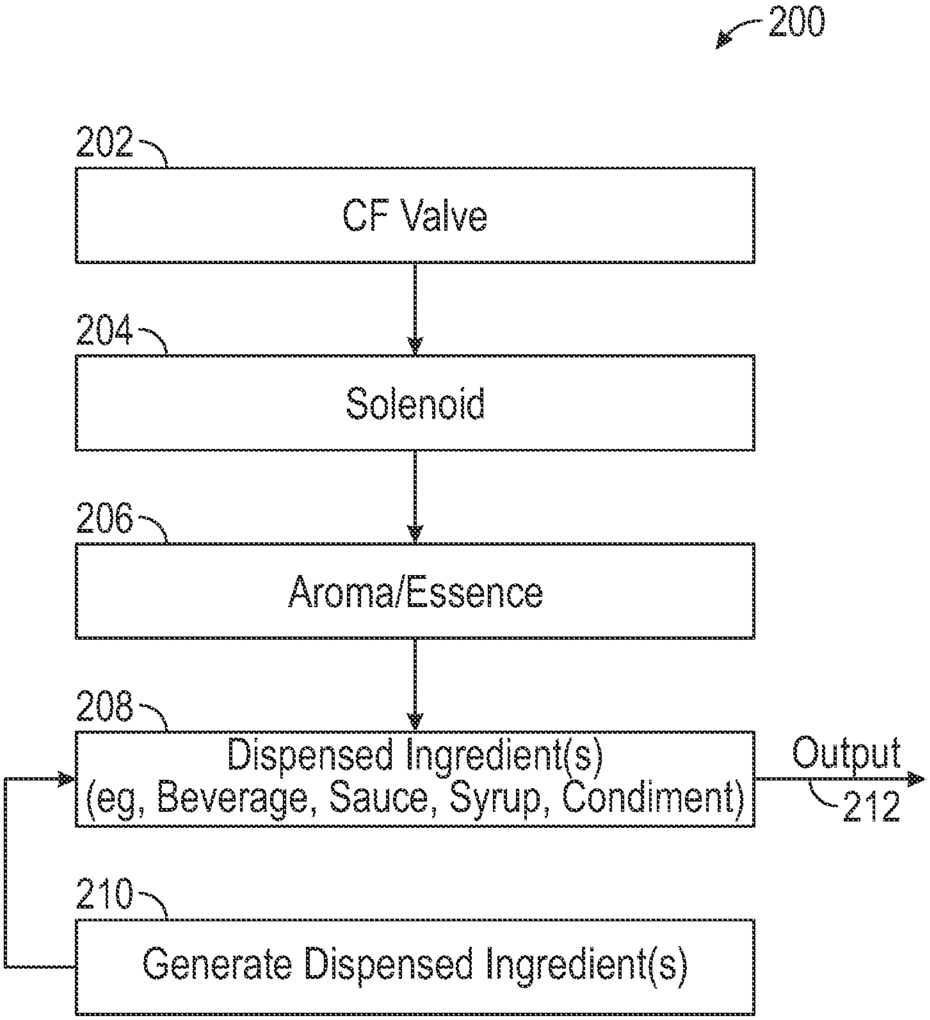
FIGS. 2A-2B are illustrations depicting various dispensing functions, according to various embodiments.
Figure 2B:
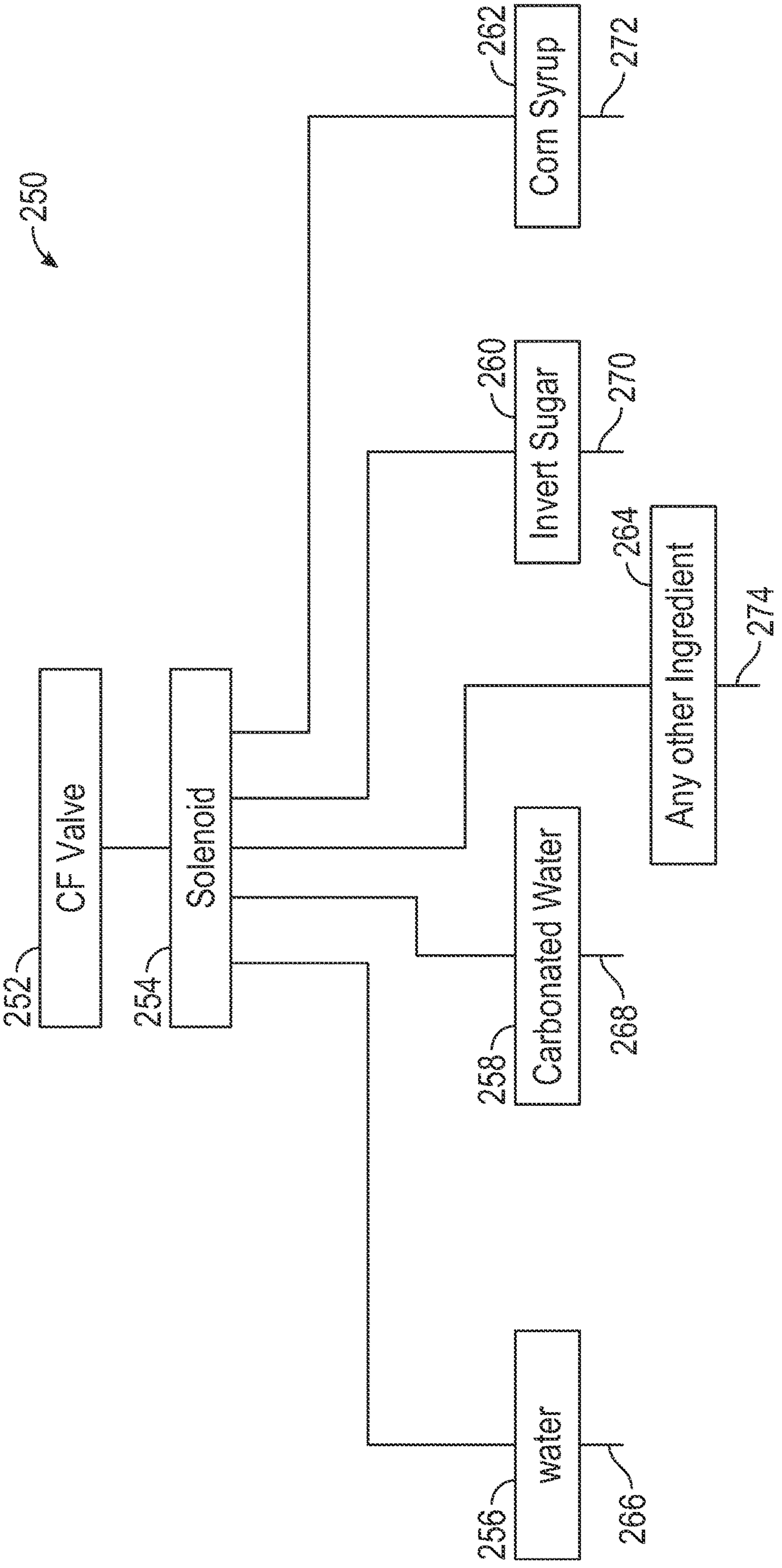

In FIGS. 2A-2B, illustrations depicting various dispensing functions are shown, according to various embodiments. FIG. 2A shows a dispensing device 200 with two parts. The first part includes a CF Valve 202, a solenoid 204, and an aroma/essence element 206. The second part includes an area where dispensed ingredients are generated 210 (e.g., coffee machine, soda machine, juice machine, etc.) which are then transported to an injection area 208 where the aroma/essence element 206 is injected into the dispensed ingredients and outputted to an output area 212.

In this system shown in FIG. 2A, a CF Valve is used to provide a dispense system for a flavor shot or aroma/essence into a dispensed ingredient (beverage, sauce, syrup, condiment). One CF Valve is controlling the essence or highly concentrated flavor that will be dispensed at several dispense points into various drink concentrates or food ingredients such as sauces, syrups or condiments.

The benefit of this system shown in FIG. 2A is that the essence or concentrated flavor will not lose its efficacy over time because it is kept in its purest form. For example, when mixed with syrups, sugar, sweetener and/or water, or other ingredients, the essence or concentrated flavor will become impure (e.g., contaminated) and the flavor and/or smell/essence will be reduced, which results in degraded beverage dispensing experiences.

In various examples, the system for the flavor dispenser can be a pressure dispensing system or a pump or atomizer to deliver the essence or concentrate flavor to the point of dispense.

FIG. 2B shows a dispensing system 250 including a CF Valve 252, a solenoid 254, a water dispenser 256, a carbonated water dispenser 258, an invert sugar dispenser 260, a corn syrup dispenser 262, and/or any other ingredient dispenser 264. In this example, the CF Valve 252 maintains the pressure and/or flow rate for each and every dispenser (e.g., the water dispenser 256, the carbonated water dispenser 258, the invert sugar dispenser 260, the corn syrup dispenser 262, and/or the any other ingredient dispenser 264) to a water outlet 266, a carbonated water outlet 268, an invert sugar outlet 270, a corn syrup outlet 272, and/or any other ingredient outlet 274.

Furthermore, in this system shown in FIG. 2B, a single CF Valve can serve multiple dispensing heads for water, carb water, invert sugar, HF corn syrup, or any other ingredient. In this example, there is no need for multiple CF Valves at each point of dispense. So for example, in a carbonated drink machine there can be a single CF Valve may control the pressure and flow rates from one or more dispense points where the flavors, syrups, inclusions are mixed. In another example, one CF Valve can control invert sugar to multiple dispense point to be mixed with flavors, syrups and water. In another example, one CF Valve can control a condiment or sauce to be dispensed from one or more dispense points to be combined with other flavors, gasses, essences (example one source of Catsup can be mixed at one point of dispense with sriracha, and at another point be mixed with tabasco, and at another served plain).

In this system shown in FIG. 2B, the benefit include space savings and costs savings by utilizing one CF Valve to feed multiple points of dispense. This savings at the point of dispense allows for more flavors/dispense points to be fit into the same footprint making the dispensing equipment more effective for the user and store owner.

Figure 3A:
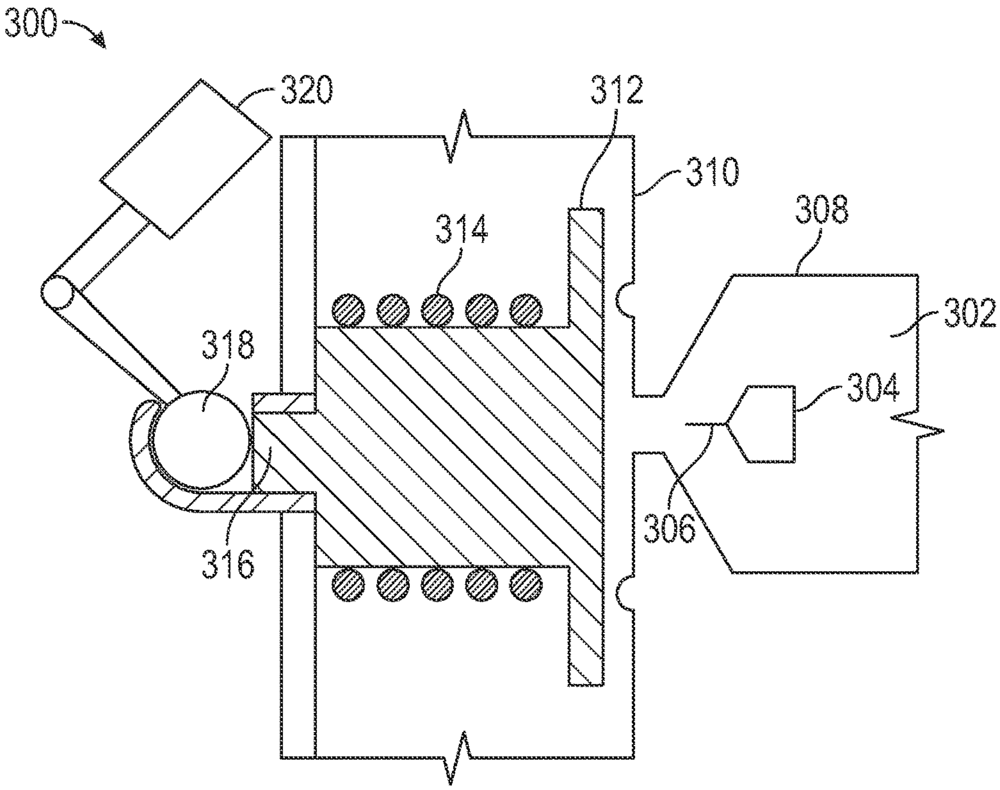
FIGS. 3A-3D are illustrations of CF Valves being utilized with toggles and/or magnetic control devices, according to various embodiments.

In FIGS. 3A-3D, illustrations of CF Valves being utilized with toggles and/or magnetic control devices are shown, according to various embodiments. FIG. 3A shows a dispensing device 300 including an inlet area 302, a pin head 304, a pin base 306, a housing 308, a diaphragm 310, a ledge 312, a spring 314, an outlet area 316, a toggle 318, and a solenoid 320.

Figure 3B:
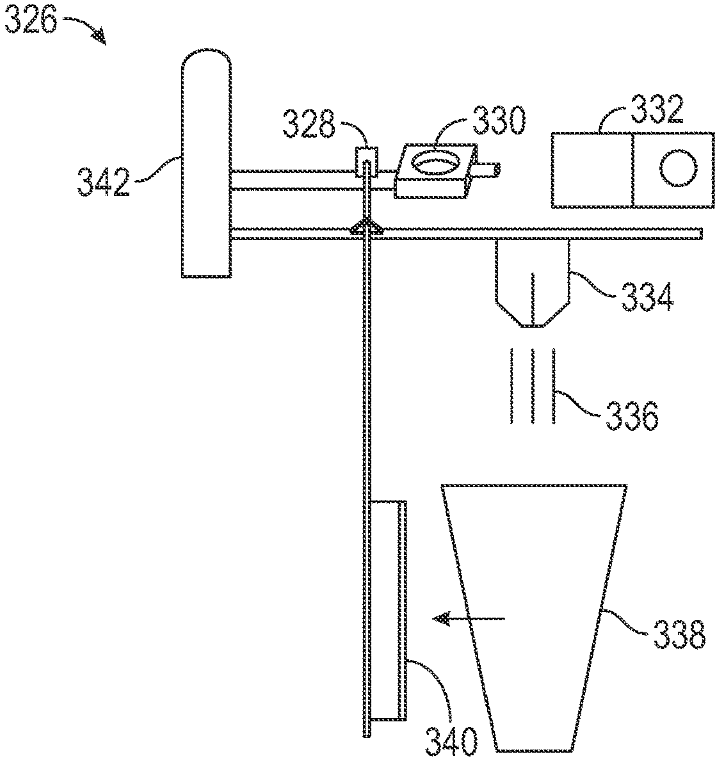

FIG. 3B shows a dispensing device 326 including a magnet 328, a ball 330, a CF Valve 332, a dispensing area 334, a dispensed material 336, a container 338, a lever 340, and a support structure 342.

Figure 3C:
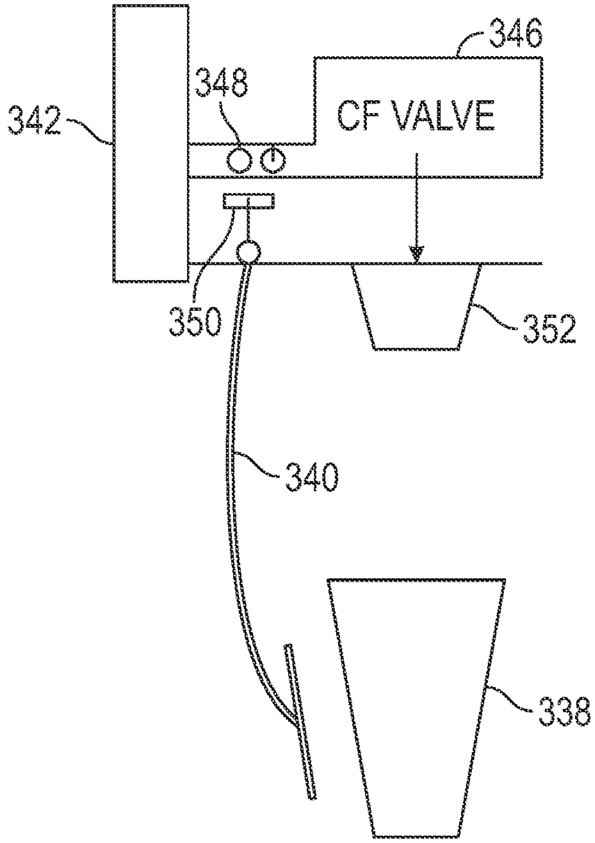

FIG. 3C shows a dispensing device 344 including a CF Valve 346, a ball 348, a magnet 350, and a dispensing area 352.

Figure 3D:
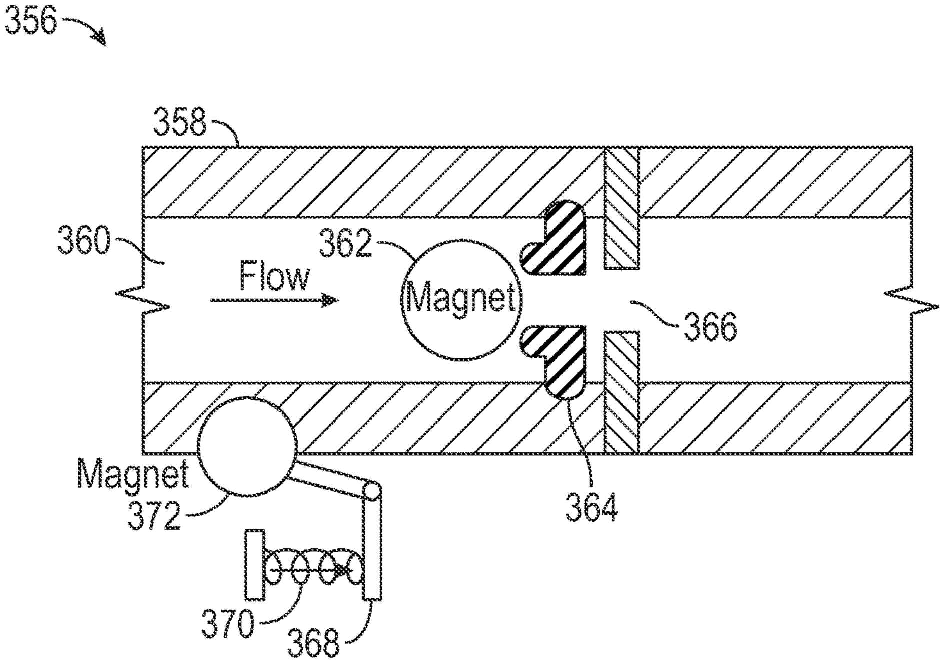

FIG. 3D shows a dispensing device 356 including a input area 358, input flow 360, a ball 362, a ball cradle 364, an outlet area 366, a lever 368, a spring 370, and a magnet 372.

In these systems shown in FIGS. 3A-3D, the solenoid is outside of the wetted path and lifts the toggle stop from the spring assembly in order to allow the CF Valve to operate normally. The Solenoid is outside the fluid path or wetted path and therefore does not require any special material and lasts longer and does not restrict the types of fluids that can pass through the valve. The solenoid acts inside the dry spring cavity to hold the diaphragm assembly in the closed position in its resting (or off state), then when actuated it lifts off the diaphragm assembly allowing the diaphragm assembly of the CF Valve to operate normally.

The benefit of the Toggle is that this system can then be integrated into an electronically controlled dispense system either with push button or a recipe based system or a computer controlled actuated system but still use the benefits of the toggle approach for valve shut off.

Overall, eliminating the need for a wetted solenoid, paddle valve or other type of electronic actuation that interacts with the fluid passage way is an important improvement to the typical discrete soda dispensing valve. Solenoids are the most common failure in the discrete valve and also add the most cost to the assembly. In one instance the cost of the solenoid is over 65% of the cost of the entire assembly. Additionally, non-electric methods of actuation could allow for the valves to function in the case of a power outage or in the case of a setting that has limited or no power. Additionally, in the current design most solenoids penetrate the wetted flow path.

Rolling Ball—In this case a food safe magnetic material is used in the flow path that with the assist of the incoming pressure is held into the close position. For example a ball that covers the inlet orifice to the CF Valve from the water or syrup source into the CF Valve. By pushing the lever (or a button) the magnet makes contact to the outside of the flow path (non-wetted) and acts to move the magnetic blockage out of the way of the flow path thereby allowing the fluid to flow into the CF Valve.

In this system the magnetic material in the flow path can seal against a rubber (or other soft) sealing surface or it can be covered with rubber or silicone or another seal material so that when it meets the inlet surface it creates a seal. In the resting position the magnetic component is sealing the flow path into a closed position when the lever or button is pushed the magnet that is outside the flow path moves the magnet away from the flow path to open the flow. In addition, the system uses the power of the inlet pressure to create a seal.

In one example, the system includes a lever spring that is used to hold the lever (or button) in the closed position by adding to the spring pressure of the CF Valve spring (pulling it away from the entrance orifice) and holding the throttle pin in a close position. The throttle pin is assisted to stay in the closed position by the inbound pressure acting against the top of the orifice. To actuate and allow fluid to flow the lever (or button) is pushed and the lever spring is pushed in which allows the CF Valve spring to operate normally and allowing the CF Valve to open and for fluid to flow normally. In another example, the system can include a sealing material on the throttle pin or on the inlet orifice to enhance the seal created. In another example, the system combines the spring loaded lever or button with a toggle to hold the diaphragm assembly in the closed position.

Figure 4A:
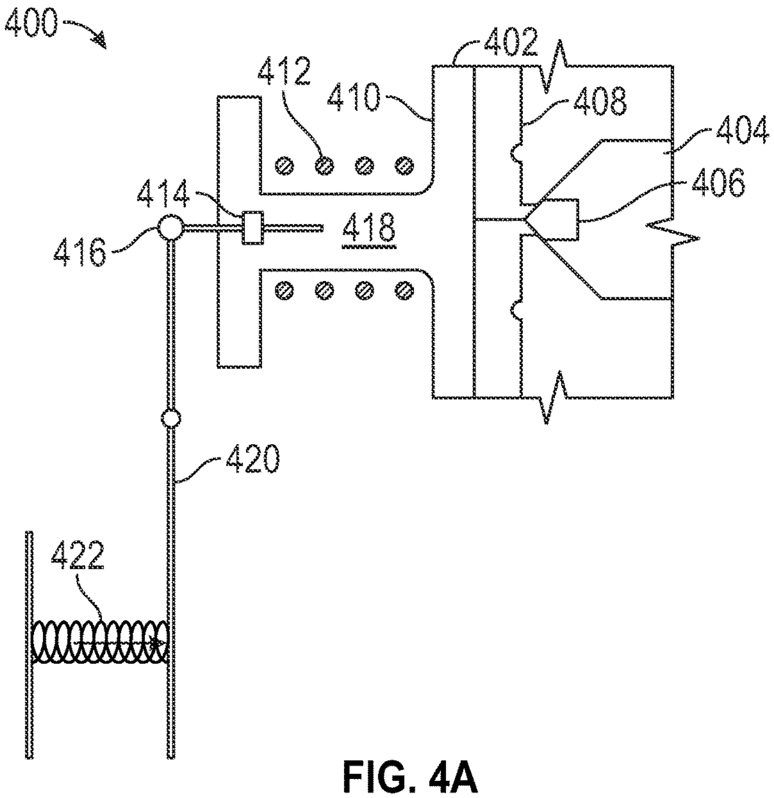
FIGS. 4A-4C are illustrations of CF Valves being utilized with closure devices, according to various embodiments.
Figure 4B:
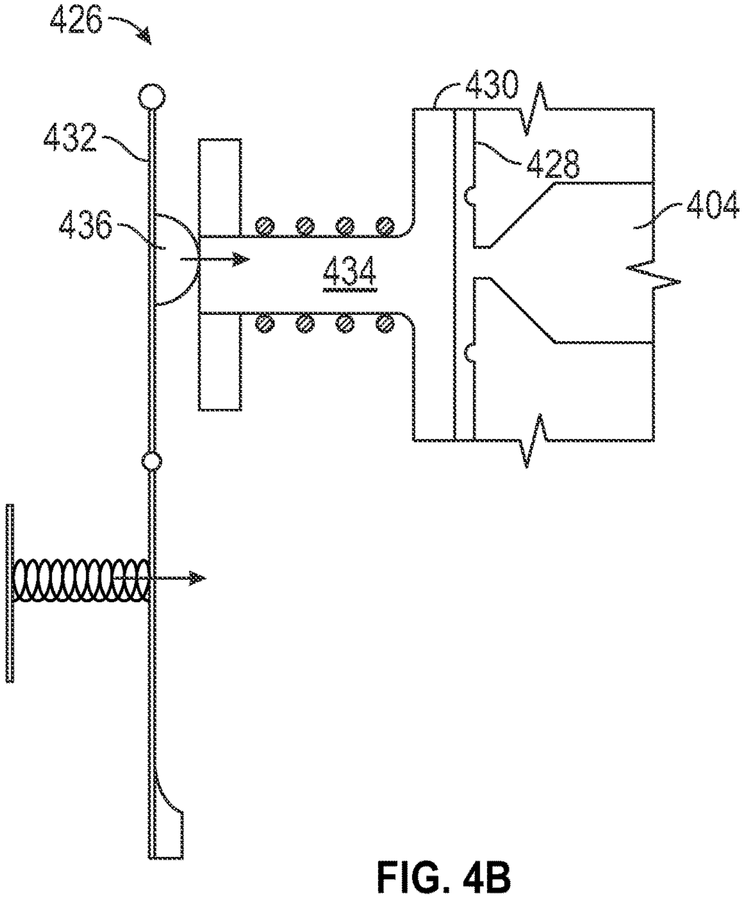
Figure 4C:
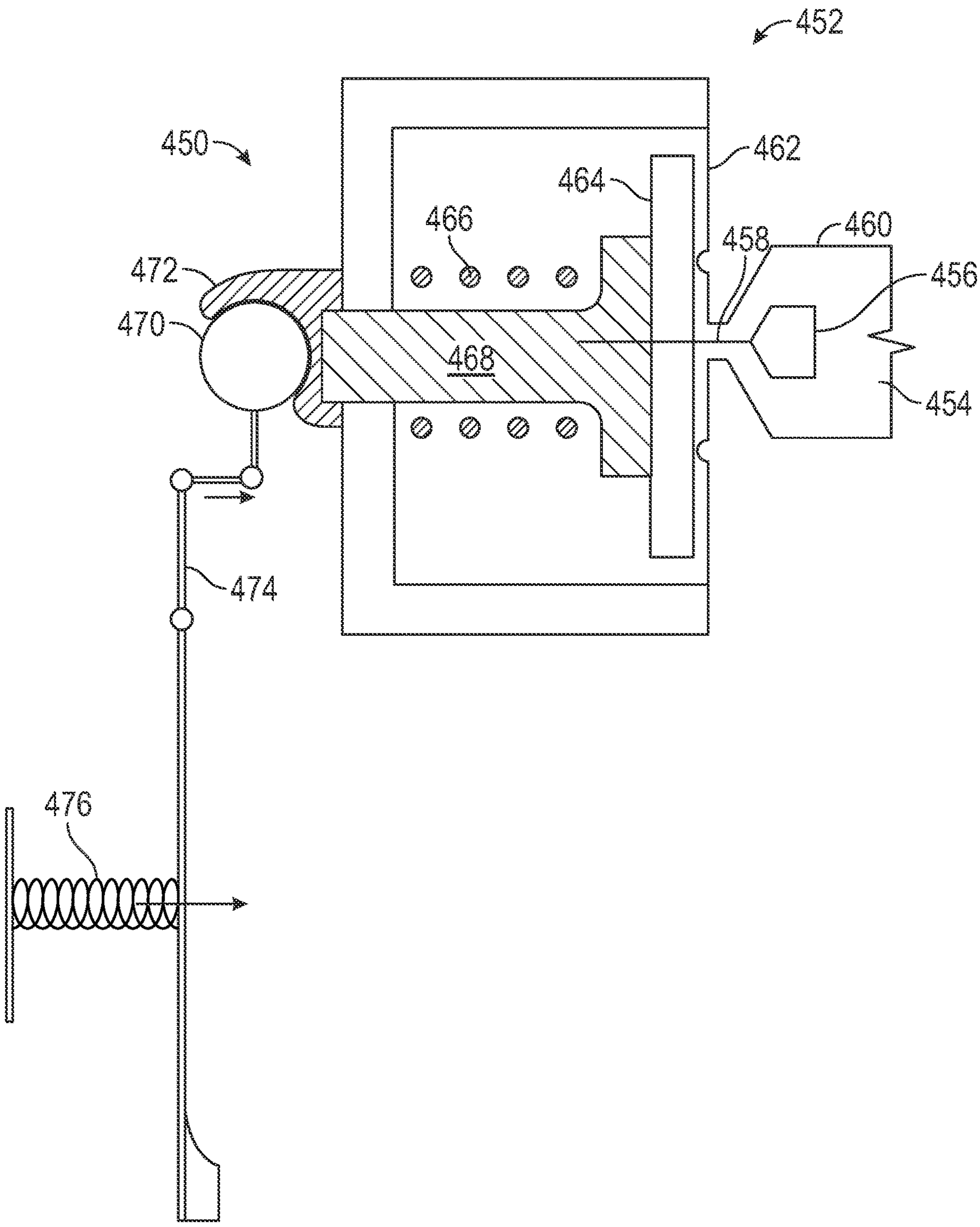

In FIGS. 4A-4C, illustrations of CF Valves being utilized with closure devices are shown, according to various embodiments. FIG. 4A shows a dispensing device 400 including a CF Valve 402, a stopping device 414, a ball 416, a lever 420, and a lever spring 422. In one example, the CF Valve 402 includes an inlet area 404, a throttle pin 406, a diaphragm 408, a wall 410, a valve spring 412, and an outlet area 418.

FIG. 4B shows a dispensing device 426 including a CF Valve 427, a stopping device 436, and a lever 436. In one example, the CF Valve 427 includes an inlet area 404, a diaphragm 428, and a wall 430.

FIG. 4C shows a dispensing device 450 including a CF Valve 452, a toggle 470, a toggle holder 472, a lever 474, and a lever spring 476. In one example, the toggle 470 includes a round part and a handle. In one example, the CF Valve 452 includes an inlet area 454, a throttle pin (e.g., throttle head 456 and pin 458), an external wall 460, a diaphragm 462, a wall 464, a valve spring 466, and an outlet area 468.

In these systems shown in FIGS. 4A-4C, the solenoid is outside of the wetted path and lifts the toggle stop from the spring assembly in order to allow the CF Valve to operate normally. The Solenoid is outside the fluid path or wetted path and therefore does not require any special material and lasts longer and does not restrict the types of fluids that can pass through the valve. The solenoid acts inside the dry spring cavity to hold the diaphragm assembly in the closed position in its resting (or off state), then when actuated it lifts off the diaphragm assembly allowing the diaphragm assembly of the CF Valve to operate normally.

The benefit of the Toggle is that this system can then be integrated into an electronically controlled dispense system either with push button or a recipe based system or a computer controlled actuated system but still use the benefits of the toggle approach for valve shut off.

Overall, eliminating the need for a wetted solenoid, paddle valve or other type of electronic actuation that interacts with the fluid passage way is an important improvement to the typical discrete soda dispensing valve. Solenoids are the most common failure in the discrete valve and also add the most cost to the assembly. In one instance the cost of the solenoid is over 65% of the cost of the entire assembly. Additionally, non-electric methods of actuation could allow for the valves to function in the case of a power outage or in the case of a setting that has limited or no power. Additionally, in the current design most solenoids penetrate the wetted flow path.

Rolling Ball—In this case a food safe magnetic material is used in the flow path that with the assist of the incoming pressure is held into the close position. For example a ball that covers the inlet orifice to the CF Valve from the water or syrup source into the CF Valve. By pushing the lever (or a button) the magnet makes contact to the outside of the flow path (non-wetted) and acts to move the magnetic blockage out of the way of the flow path thereby allowing the fluid to flow into the CF Valve.

In this system the magnetic material in the flow path can seal against a rubber (or other soft) sealing surface or it can be covered with rubber or silicone or another seal material so that when it meets the inlet surface it creates a seal. In the resting position the magnetic component is sealing the flow path into a closed position when the lever or button is pushed the magnet that is outside the flow path moves the magnet away from the flow path to open the flow. In addition, the system uses the power of the inlet pressure to create a seal.

In one example, the system includes a lever spring that is used to hold the lever (or button) in the closed position by adding to the spring pressure of the CF Valve spring (pulling it away from the entrance orifice) and holding the throttle pin in a close position. The throttle pin is assisted to stay in the closed position by the inbound pressure acting against the top of the orifice. To actuate and allow fluid to flow the lever (or button) is pushed and the lever spring is pushed in which allows the CF Valve spring to operate normally and allowing the CF Valve to open and for fluid to flow normally. In another example, the system can include a sealing material on the throttle pin or on the inlet orifice to enhance the seal created. In another example, the system combines the spring loaded lever or button with a toggle to hold the diaphragm assembly in the closed position.

Figure 5:
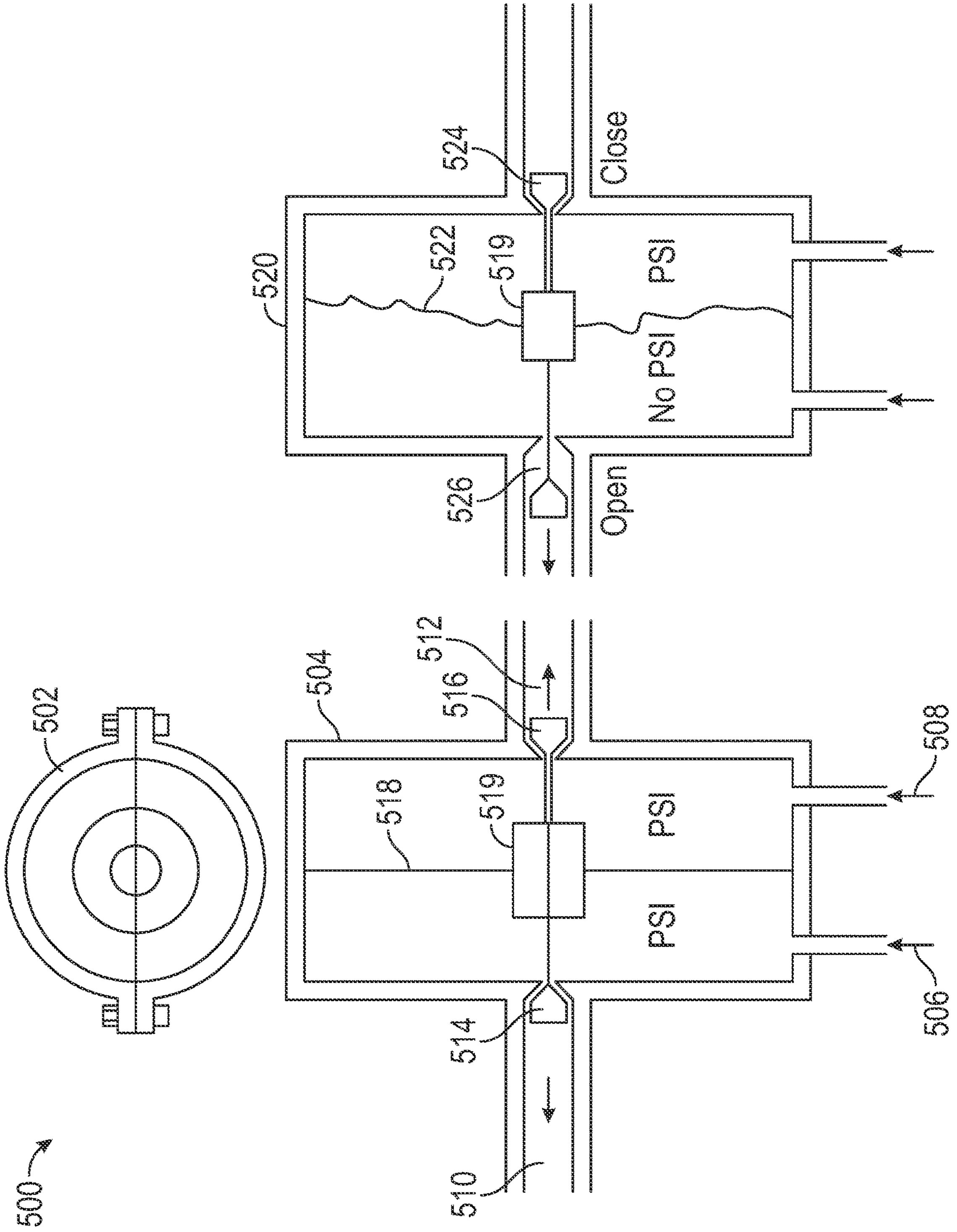
FIG. 5 is an illustration of an out-of-service device, according to one embodiment.

In FIG. 5, an illustration of an out-of-service device is shown, according to one embodiment. FIG. 5 shows a dispensing device in a first state 500 and the dispensing device in a second state 520. In one example, the dispensing device includes a housing 504, a syrup line inlet 506, a water line inlet 508, a syrup exit area 510, a water exit area 512, a syrup side throttle pin 514, a water side throttle pin 516, a diaphragm 518, and/or a throttle pin coupling device 519. In one example, a diaphragm 502 (e.g., diaphragm 518 and diaphragm 522) are shown in an enhanced illustration. In one example, the dispensing device in the first state 500 has acceptable pressure on both the syrup line side and water line side. Therefore, both the syrup line side and the water line side are open and either syrup and/or water flows through their respective sides. In one example, the dispensing device in the second state 520 has no pressure and/or an inadequate pressure in and/or on the syrup line side, which moves the throttle pin coupling device 519 towards the line side with no pressure and/or inadequate pressure. Since the throttle pin coupling device 519 is coupled to both the syrup side throttle pin 514 and the water side throttle pin 516, the movement of the throttle pin coupling device 519 towards the syrup line side forces the water side throttle pin 516 to move to a closed position. After the water side throttle pin 516 moves to a closed position, any water flow from the water side is terminated. In one example, when the pressure is restored to an adequate level on the syrup line side, the throttle pin coupling device 519 will move back to a neutral position, which allows the water side throttle pin 516 to move to an open position allowing for water flow to resume.

In one example, the dispensing device in the first state 500 has acceptable pressure on both the syrup line side and water line side. Therefore, both the syrup line side and the water line side are open and either syrup and/or water flows through their respective sides. In one example, the dispensing device in an Nth state has no pressure and/or an inadequate pressure in and/or on the water line side, which moves the throttle pin coupling device 519 towards the line side with no pressure and/or inadequate pressure. Since the throttle pin coupling device 519 is coupled to both the syrup side throttle pin 514 and the water side throttle pin 516, the movement of the throttle pin coupling device 519 towards the water line side forces the syrup side throttle pin 514 to move to a closed position. After the syrup side throttle pin 514 moves to a closed position, any syrup flow from the syrup side is terminated. In one example, when the pressure is restored to an adequate level on the water line side, the throttle pin coupling device 519 will move back to a neutral position, which allows the syrup side throttle pin 514 to move to an open position allowing for syrup flow to resume.

In this system shown in FIG. 5, an auto shut off is created for sold out situations when dispensing one or more ingredients. In this system there are two fluids separated by a diaphragm. The diaphragm is connected to each fluid passage outlet where a throttle pin or other blocking device is connected to the diaphragm. If the fluid into one side of the passage way is sold out there is no PSI on that side of the diaphragm and the PSI for the other side acts to push the diaphragm over to the "sold out" side and pulls the shut off into the closed position thereby not allowing any of the second fluid to pass when the first fluid is sold out. As soon as fluid #1 begins to flow again (e.g., pump restarted, or empty BIB or container replaced) the diaphragm PSI from fluid #1 will act upon the diaphragm causing it to return to the neutral position. When both fluids are flowing the diaphragm stays in the neutral position and both fluids can pass into and out of the chamber.

The benefit of this system is that it does not require pressure switches or electrical connections to create a "sold-out" shut off. If one or the other fluid (for example, drink concentrate and water) is out the other fluid will not flow.

Figure 6:
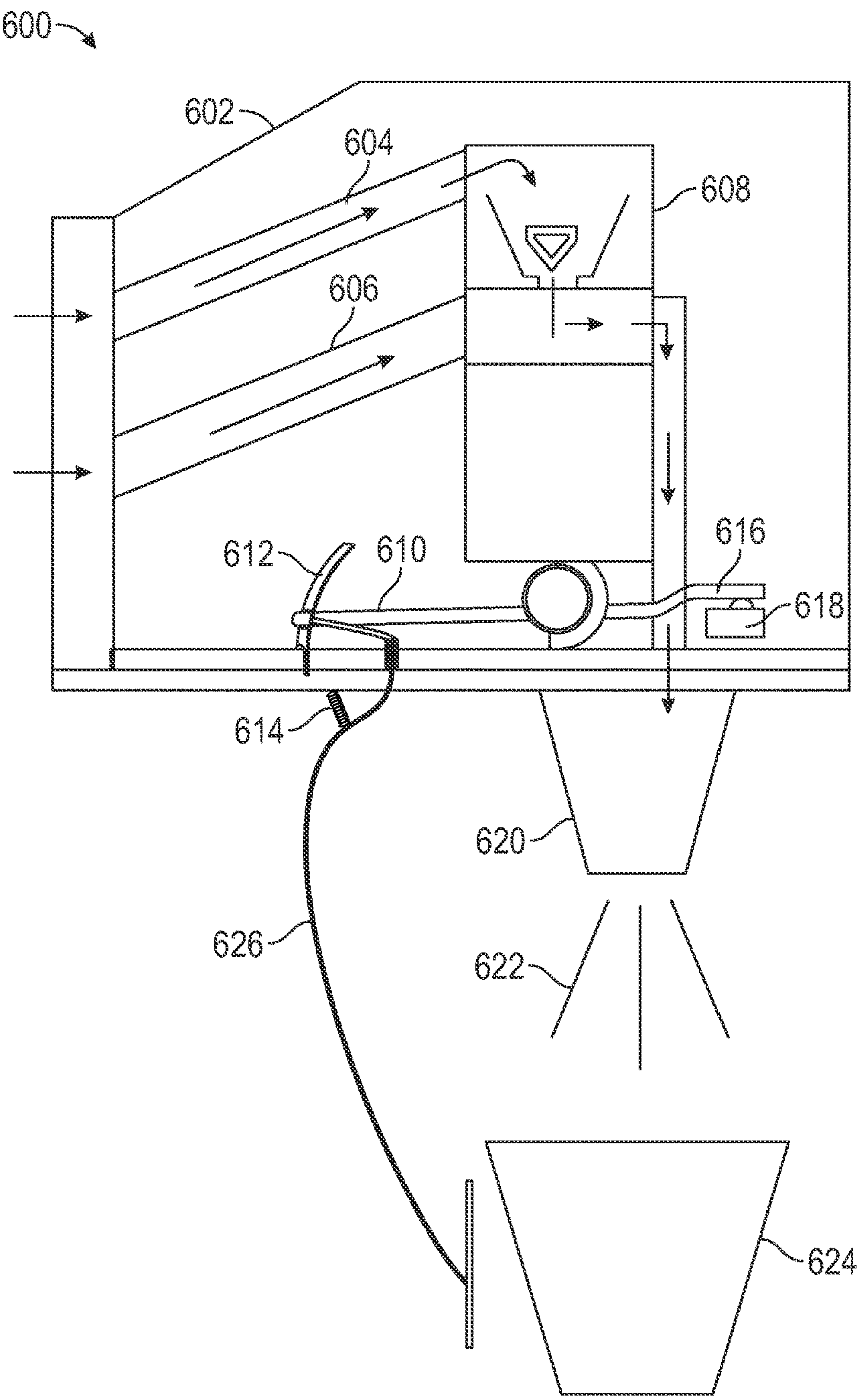
FIG. 6 is an illustration of a toggle dispensing device, according to one embodiment.

In FIG. 6, an illustration of a toggle dispensing device is shown, according to one embodiment. FIG. 6 shows a dispensing device 600 with a housing 602, a water line 604, a syrup line 606, a CF Valve 608, a toggle 610, a toggle on/off switch 612, a lever spring 614, a toggle holder 616, an actuator counter 618, a diffuser 620, and a lever 626. In one example, a dispensed product 622 is dispensed into a container 624.

In this system shown in FIG. 6, the toggle has two additional features. First, the system is built to include a micro switch that actuates when the lever is pushed in order to record "time on". By recording time on we can record the amount of syrup and water that is dispensed as the CF Valve is a fixed flow valve. Second, the system is designed to fit under an existing cover and to include any size or type of lever as the leverage on the toggle and the force to put the toggle into the shut or on position is minimal.

The benefit of this system is that it eliminates the need for a solenoid and power to run the valve but still includes the ability to capture digital data for the purposes of measuring dispense, time of dispense, inventory usage, reordering, etc.

In addition, this system utilizes the lever which can actuate the toggle that controls the water and the syrup/concentrate at the same time. Further, this system could also use a button push.

Figure 7:
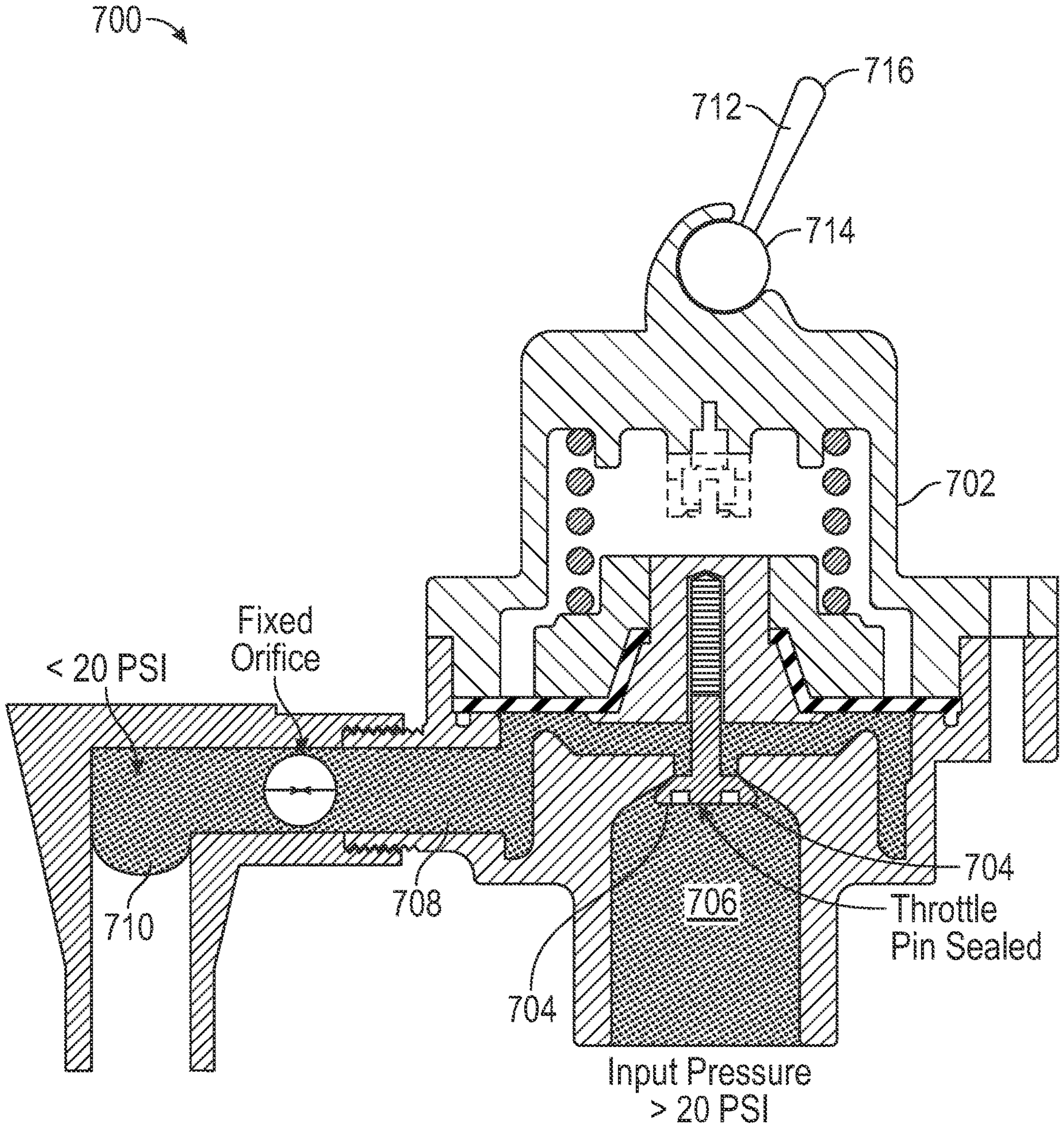
FIG. 7 is an illustration of a toggle dispensing device, according to one embodiment.

In FIG. 7, an illustration of a toggle dispensing device is shown, according to one embodiment. FIG. 7 shows a dispensing device 700 including a CF Valve 702 and a toggle 716. In one example, the CF Valve 702 includes a throttle pin 704 (with a head and a pin), an inlet area 706, an outlet area 708 before the orifice, and an outlet area 710 after the orifice. In one example, the toggle 716 includes a handle 712 and a ball 714.

In this system shown in FIG. 7, the toggle is built into the CF Valve for dispensing craft soda or beer or wine or any other fluid. In one example, the toggle is shaped as a TAP for a craft handle and acts to open and close the valve. In another example, the control can be right at the faucet or internal to the faucet.

Figure 8A:
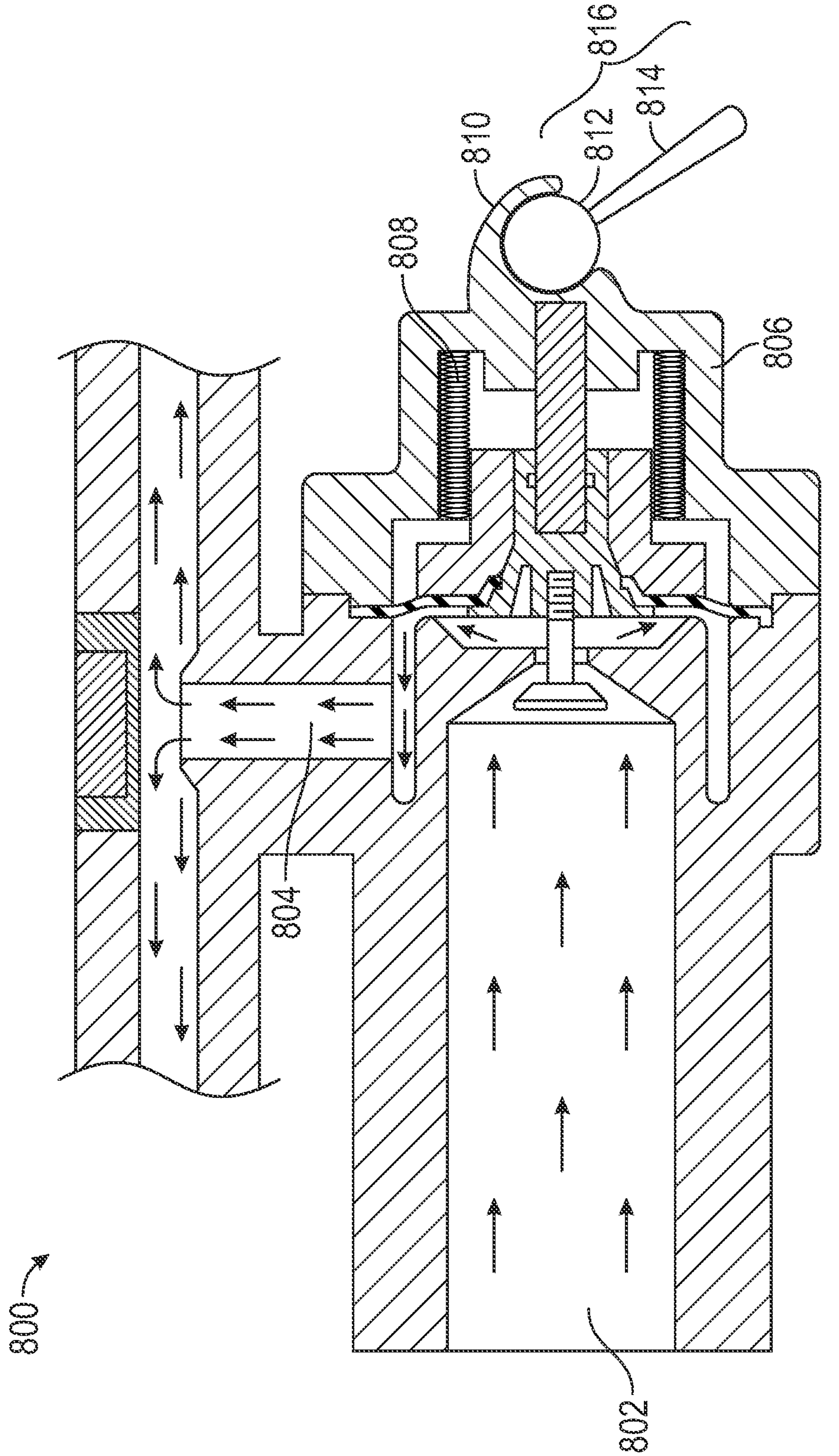
FIGS. 8A-8B are illustrations of toggle dispensing devices, according to various embodiments.
Figure 8B:
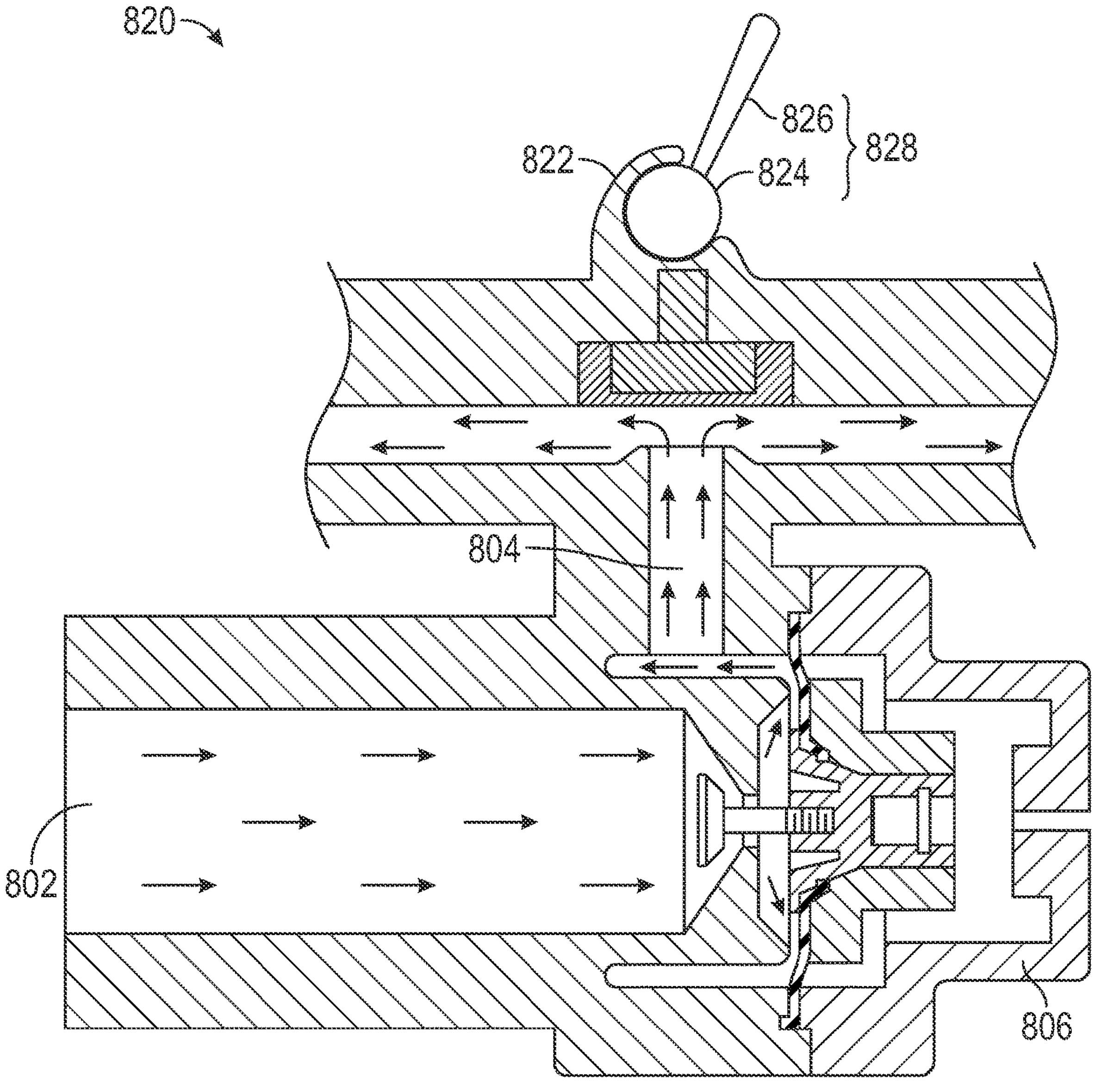

In FIGS. 8A-8B, illustrations of toggle dispensing devices are shown, according to various embodiments. FIG. 8A shows a CF Valve 800 with a toggle 816. In one example, the CF Valve 800 includes an inlet area 802, an outlet area 804, and springs (e.g., 806 and 808). In one example, the toggle 816 includes a ball 812 and a handle 814. In addition, a toggle holder 810 is shown.

This system shown in FIG. 8A utilizes the toggle shut off with a CFiVe valve or any CF Valve. This eliminates the need for a solenoid and can be used for a dual outlet (as shown) or single or multiple outlet valve. The toggle in the open position allows the diaphragm/spring assembly to operate normally. The toggle in the off position provides additional pressure to hold the diaphragm assembly against the sealing ring to not allow fluid to flow past the diaphragm into the outlet of the valve. The toggle stem pushes down on the diaphragm assembly adding to the spring pressure and not allowing the fluid to pass through.

FIG. 8B shows a CF Valve 820 with a toggle 828. In this example, the toggle 828 is down stream of the CF Valve 820. Further, the toggle 828 includes a base 824 and a handle 826. In addition, a toggle holder 822 is shown. In one example, the toggle acts to shut the flow of fluid after the CF Valve. Since the CF Valve is upstream of the toggle the pressure is regulated and therefore the force required to close and hold the flow is substantially less than would be upstream where the toggle would be closed and held close against the full line pressure.

Figure 9:
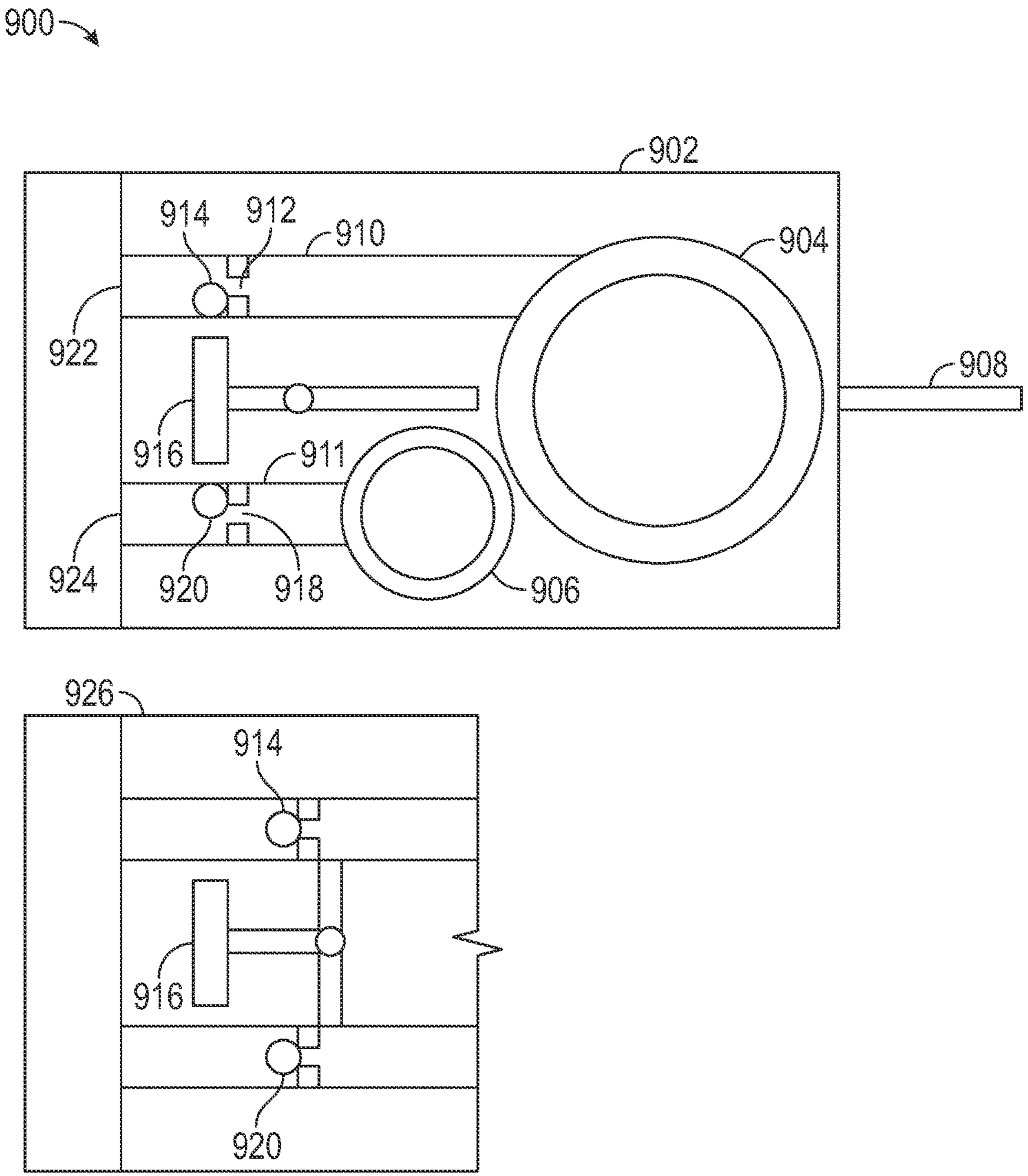
FIG. 9 is an illustration of block device, according to one embodiment.

In FIG. 9, an illustration of blocking device is shown, according to one embodiment. FIG. 9 shows a dispensing device 900 including a housing 902, a water source 904, a syrup source 906, a pressure source 908, a water line 910, a syrup line 911, a water passage 912, a water blocking device 914, a magnet 916, a water outlet area 922, a syrup passage 918, a syrup blocking device 920, and a syrup outlet area 924. In this example, magnet 916 moves the water blocking device 914 and the syrup blocking device 920 to allow flow through both the water passage 912 and the syrup passage 918. This can be accomplished by either turning the magnet on or by moving the magnet into a position in which the magnet will act on the water blocking device 914 and the syrup blocking device 920 to cause the water blocking device 914 and the syrup blocking device 920 to move away from and/or unblock the water passage 912 and the syrup passage 918.

In this system shown in FIG. 9, the system utilizes a single magnet to control two or more fluid passageways. In this instance, the system uses a rolling ball magnetic material coupled with a sealing surface that can be plastic, metal or rubber/silicone, or another material. In the normal state the valve is shut. The upstream fluid pressure acts to hold the ball in place sealing against the sealing surface. When the magnet is placed in the center of the two (or more) fluid passageways by pushing a button or lever to move the magnet the magnetic balls move away from the sealing surface and the fluids are able to pass to the outlet of the valve.

Figure 10:
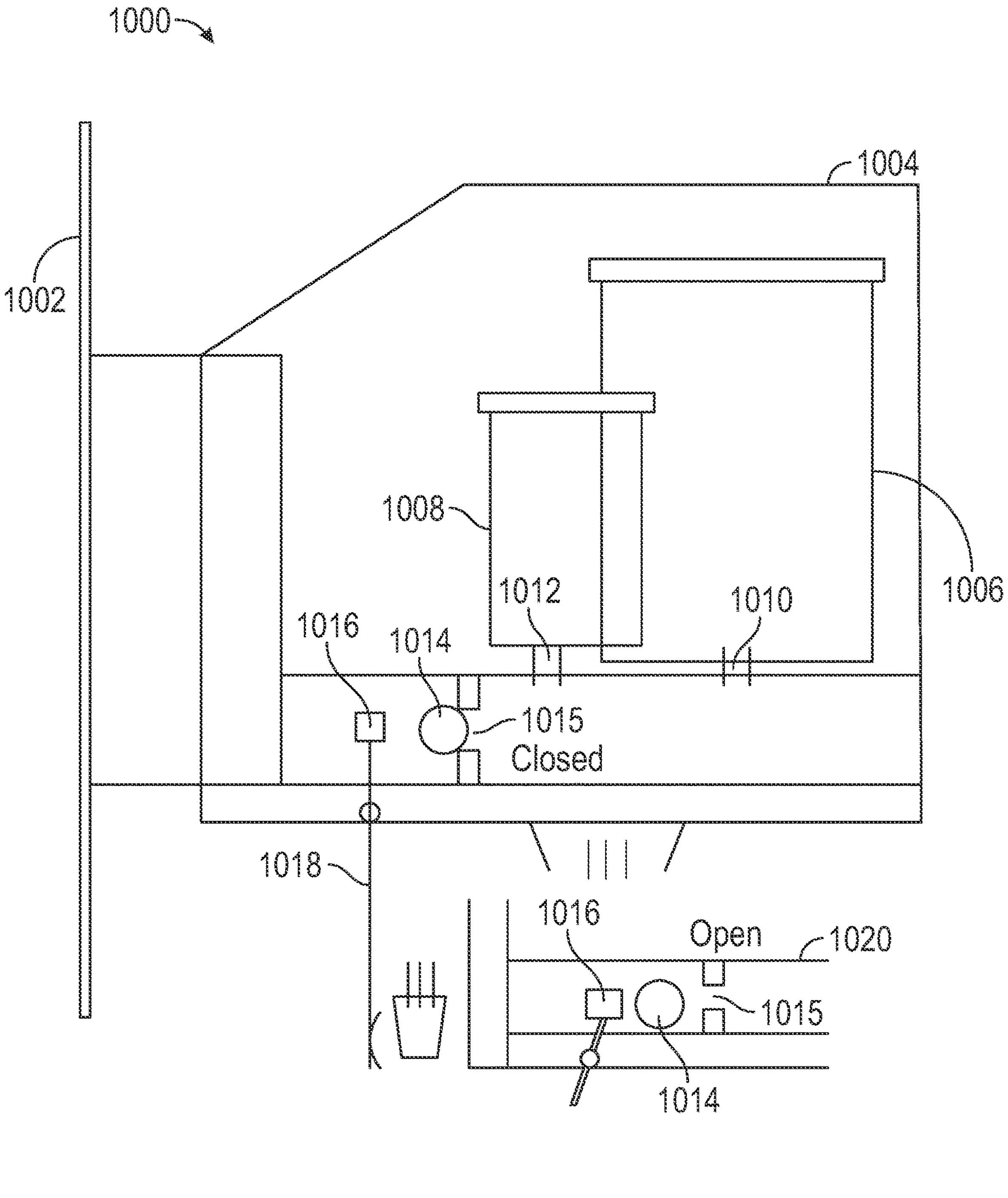
FIG. 10 is an illustration of a dispensing system using a block device, according to one embodiment.

In FIG. 10, an illustration of a dispensing system using a block device is shown, according to one embodiment. FIG. 10 shows a dispensing device 1000 with a bulkhead 1002, a housing 1004, a water source 1006, a syrup source 1008, a water outlet area 1010, a syrup outlet area 1012, a blocking device 1014 (e.g., magnetic ball), a passage way 1015, a magnet 1016, and a lever 1018.

In this system shown in FIG. 10, the system uses a magnetic ball with a lever that passes into the fluid passageway to move the magnetic ball from the off (normally closed) to the on position.

Figure 11:
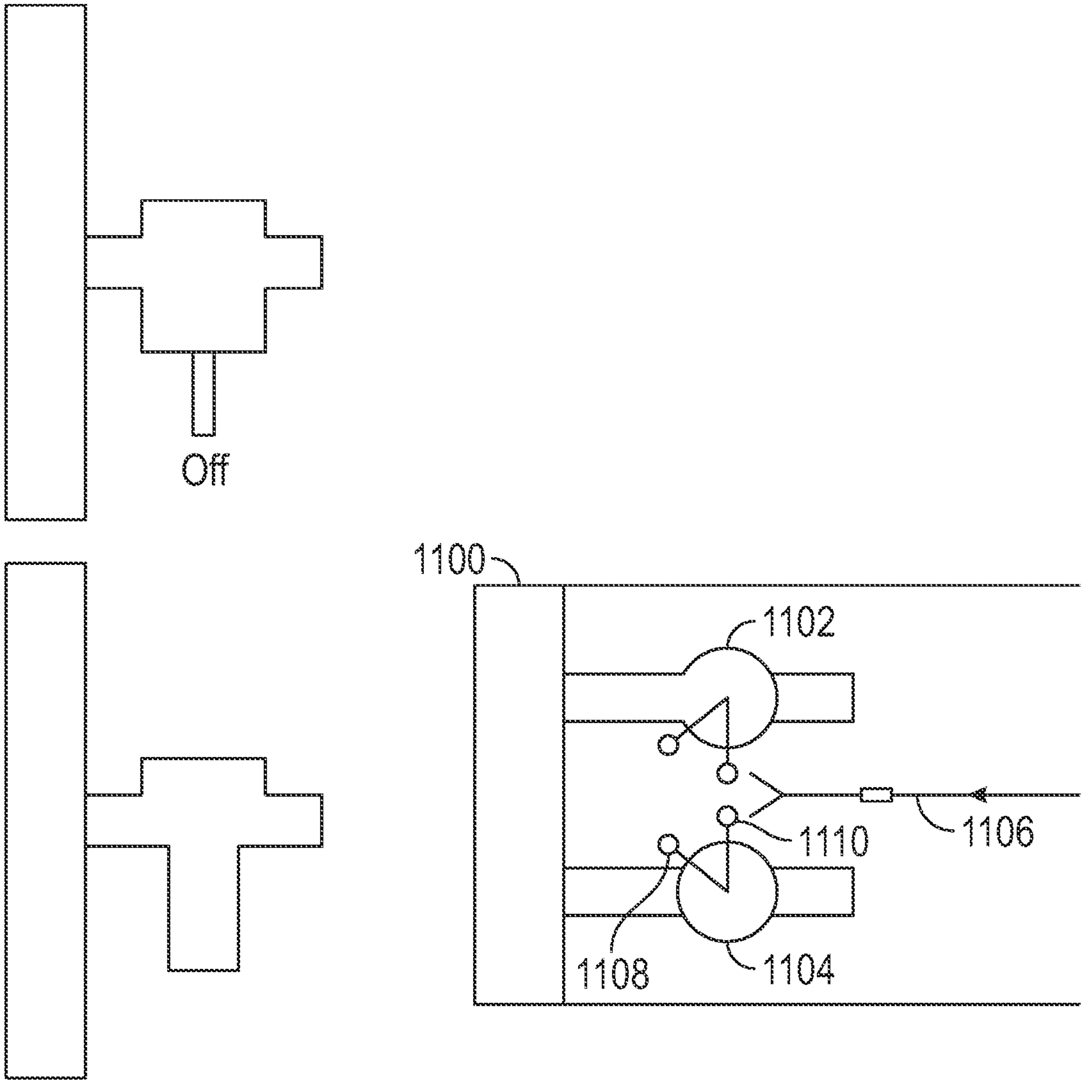
FIG. 11 is an illustration of a dispensing system, according to one embodiment.

In FIG. 11, an illustration of a dispensing system is shown, according to one embodiment. FIG. 11 shows a dispensing device 1100 with a ball valve 1102 in a first position and a ball valve 1104 in a second position. In addition, a lever 1106 is shown which places the ball valve 1102 in either an on-position 1108 or an off-position 1110.

In this example shown in FIG. 11, the system utilizes a ¼ turn ball valve downstream of the CF Valve to shut off the fluid passageway. In the off-position the ball valve is blocking the fluid. In the on-position, the valve need only move 0.100" or –0.150" in order to allow the appropriate amount of fluid to pass into the outlet of the system. This ball valve can be used for dosing as it creates a variable orifice to control the flow of the fluid downstream of the CF Valve. In another example, the lever could have multiple positions that move the ball valve different amounts revealing more or less of the fluid passageway. The advantage of this system is that it is very inexpensive and can provide accurate dosing without the need for pulsing solenoids.

Figure 12:
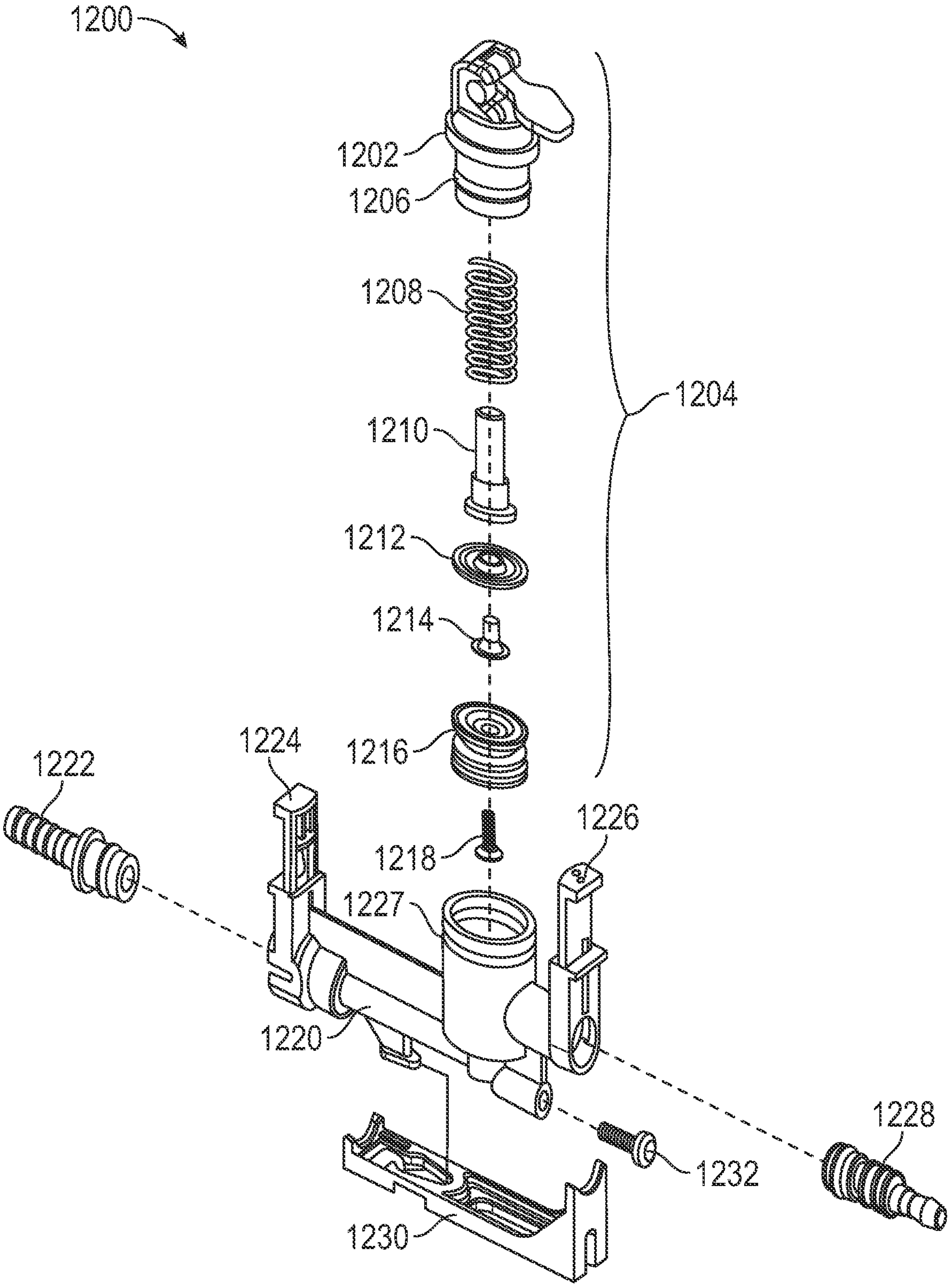
FIG. 12 is an illustration of toggle device, a CF Valve, and dispensing device, according to one embodiment.

In FIG. 12, an illustration of toggle device, a CF Valve and dispensing device are shown, according to one embodiment. FIG. 12 shows a dispensing device 1200 with a toggle 1202, a CF Valve 1204, a passage way 1220, and a base 1230. In this example, the CF Valve 1204 includes a top body portion 1206, a spring 1208, an upper internal body 1210, a diaphragm 1212, a lower internal body 1214, a bottom body portion 1216, and a throttle pin 1218 (which includes a throttle head and pin). In one example, the passage way 1220 includes an inlet insert 1222, a first dry break 1224, a CF Valve holder 1227, a second dry break 1226, an outlet insert 1228, and a securing device 1232. In this example, the securing device 1232 attaches the base 1230 to the passage way 1220.

In this system shown in FIG. 12, the CF Valve utilized in a bar gun manifold utilizes a toggle to place the valve into a closed status when the bar gun is removed. In one example, bar gun manifolds use a ball valve or other shut offs that were in the fluid passageway because they needed to close against incoming pressure they were difficult to turn often requiring a tool. Additionally, when they broke (especially when manipulated with a tool) because the ball valve (or other) penetrated into the fluid passageway, the valve would leak out the broken ball valve potentially causing catastrophic failures. The toggle is in the dry cavity and holds the diaphragm in place so that fluid cannot pass. The toggle mechanism is in the dry cavity of the CF Valve. If the toggle were to "break" there is no leak unless the gun is removed.

Figure 13A:
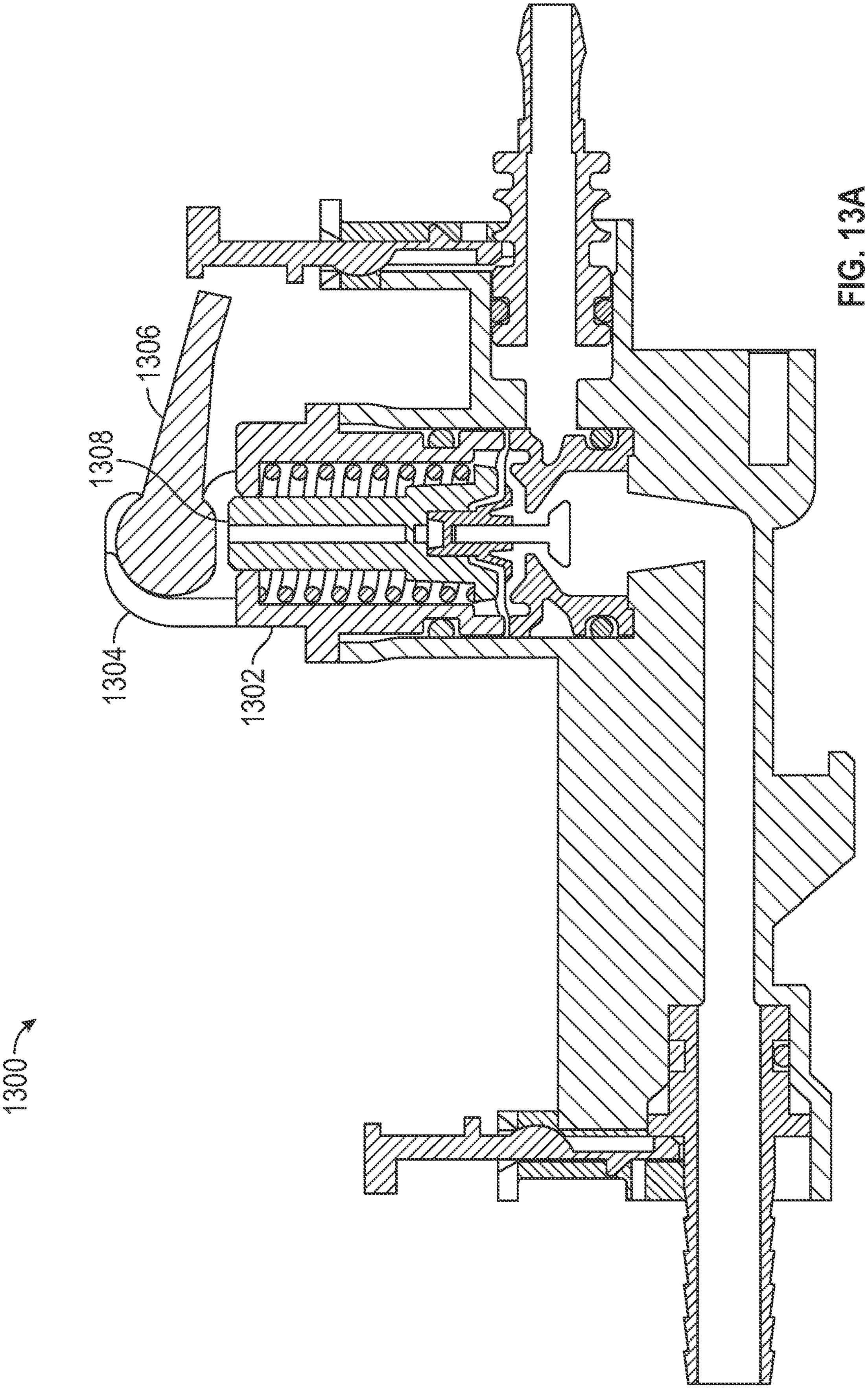
FIGS. 13A-13B are illustrations of a toggle dispensing device, according to various embodiments.
Figure 13B:
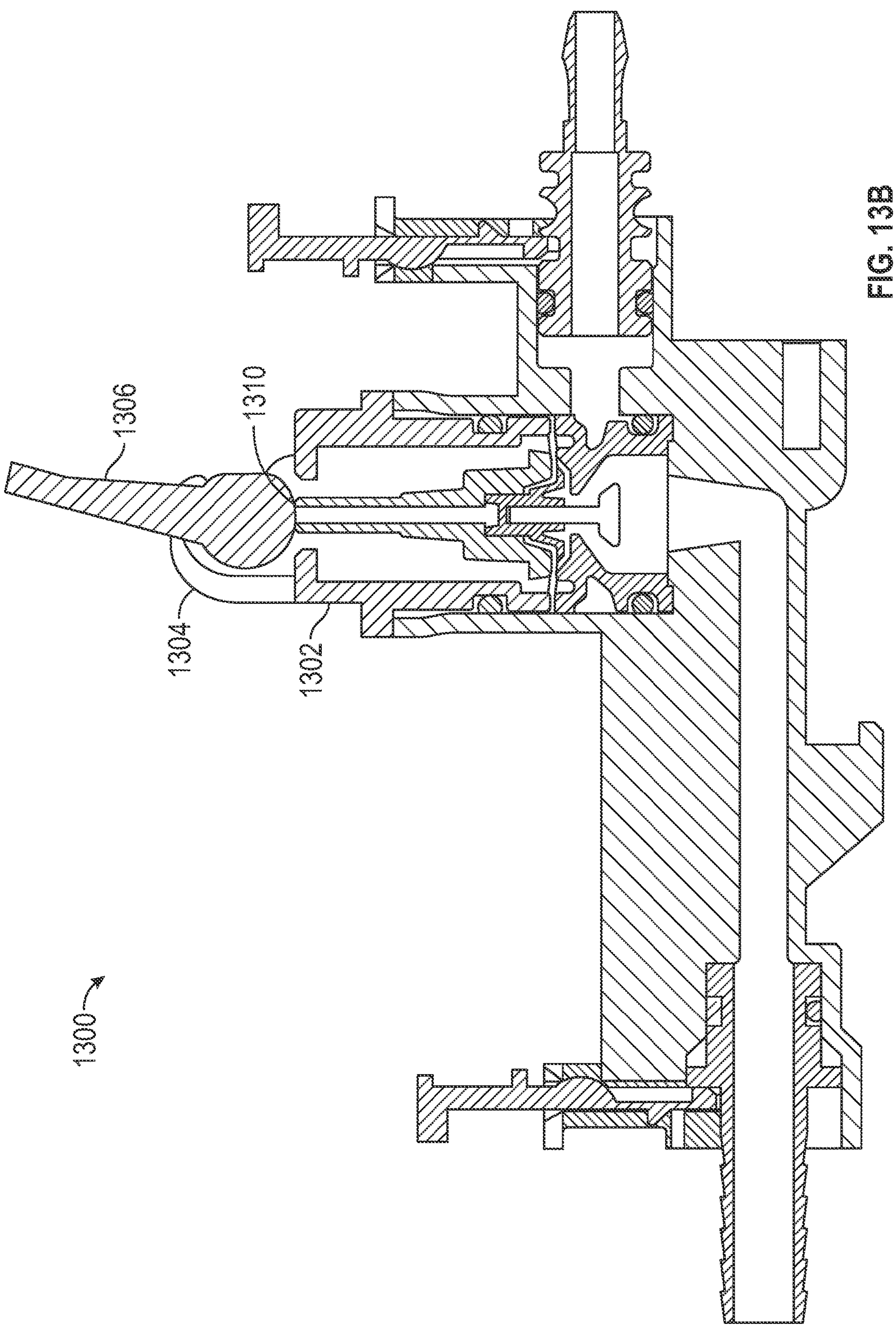

In FIGS. 13A-13B, illustrations of a toggle dispensing device are shown, according to various embodiments. FIG. 13A shows a dispensing device 1300 with a CF Valve 1302, a toggle 1306, and a toggle holder 1304. In one example, the toggle 1306 is shown in an open position which allows for fluid flow. This can be seen because a CF Valve outlet area 1308 is not blocked by the toggle 1306. FIG. 13B shows the toggle 1306 in a closed position which does not allow for fluid flow. This can be seen because the CF Valve outlet area 1310 is blocked by the toggle 1306.

Figure 14:
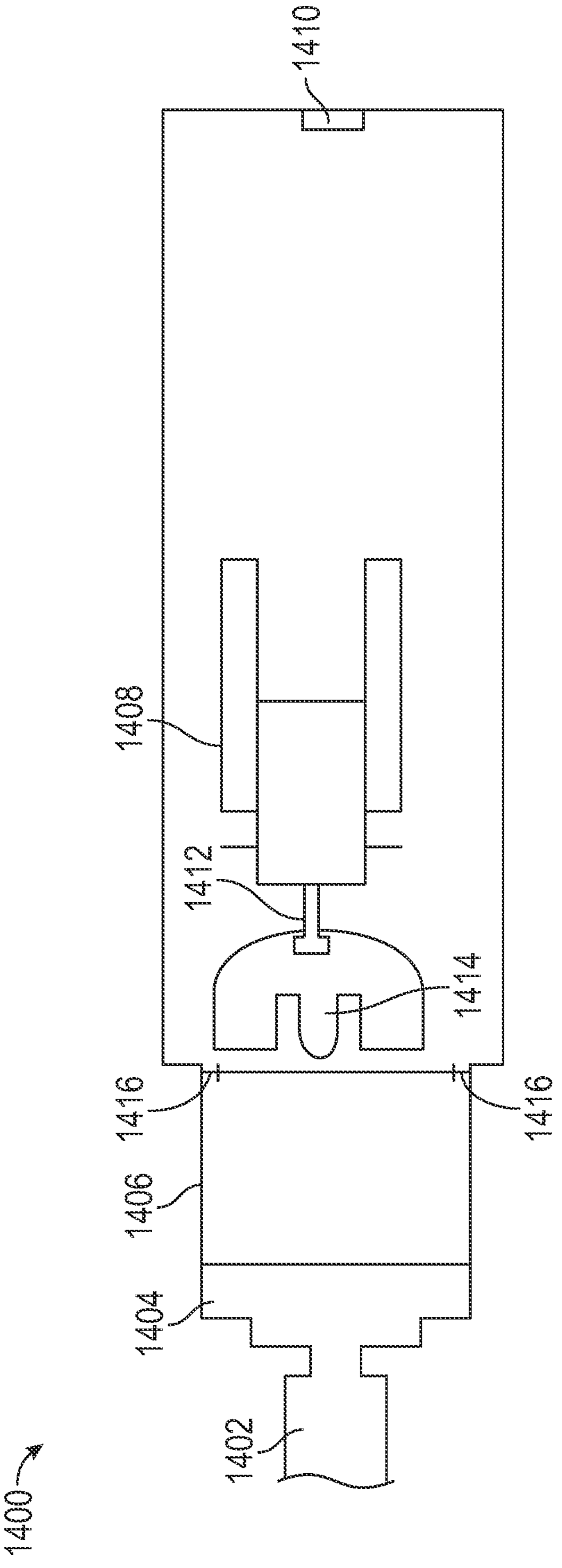
FIG. 14 is an illustration of the pressurized valve, according to one embodiment.

In FIG. 14, an illustration of the pressurized valve is shown, according to one embodiment. FIG. 14 shows a dispensing device 1400 with an inlet area 1402, a dry break 1404, a CF Valve 1406, a solenoid 1408, a solenoid adjuster 1410, a solenoid head 1412, a reservoir area 1414, and outlet areas of the CF Valve 1416.

Figure 15:
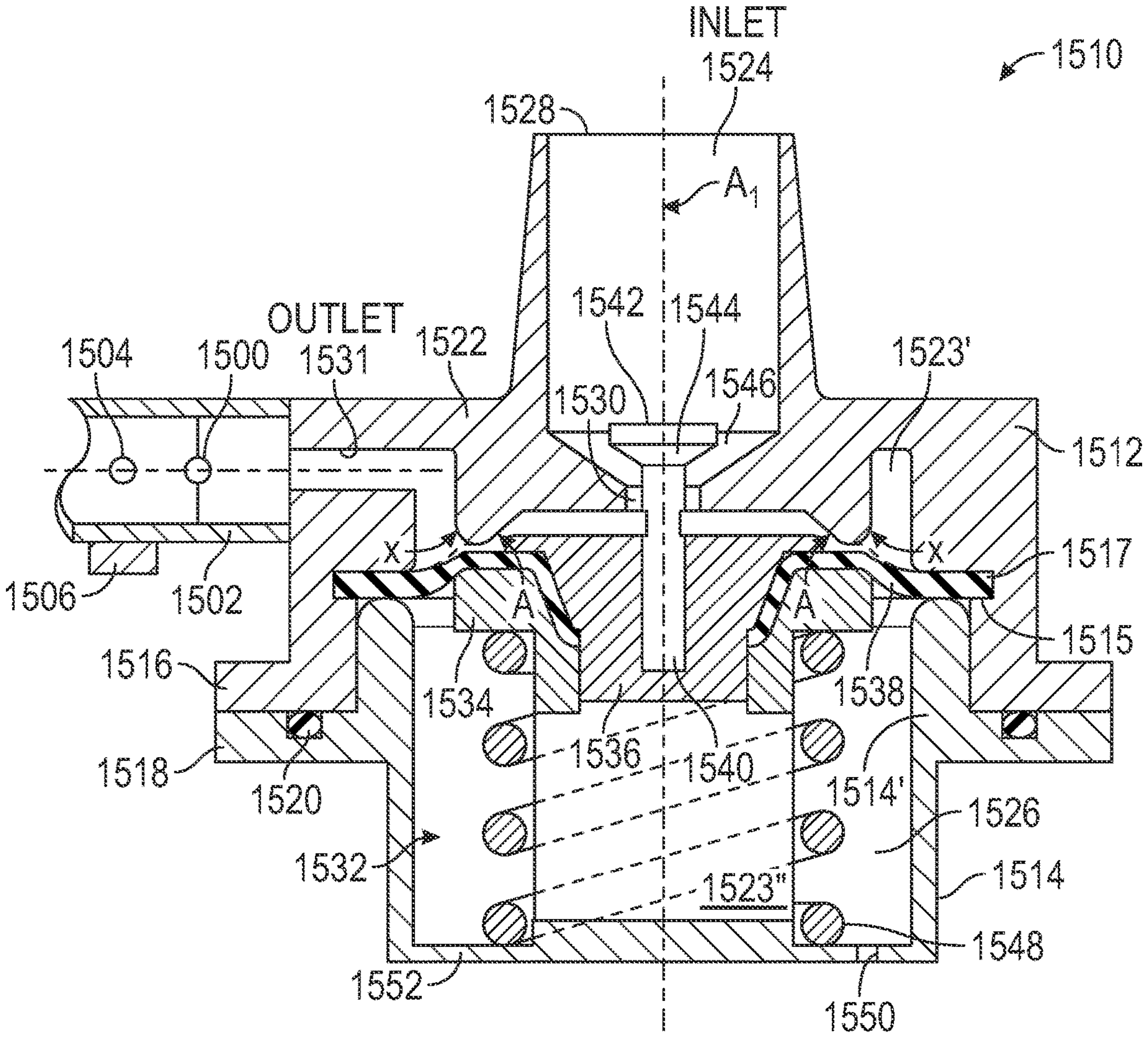
FIGS. 15-16 are illustrations of a CF Valve, according to various embodiments.
Figure 16:
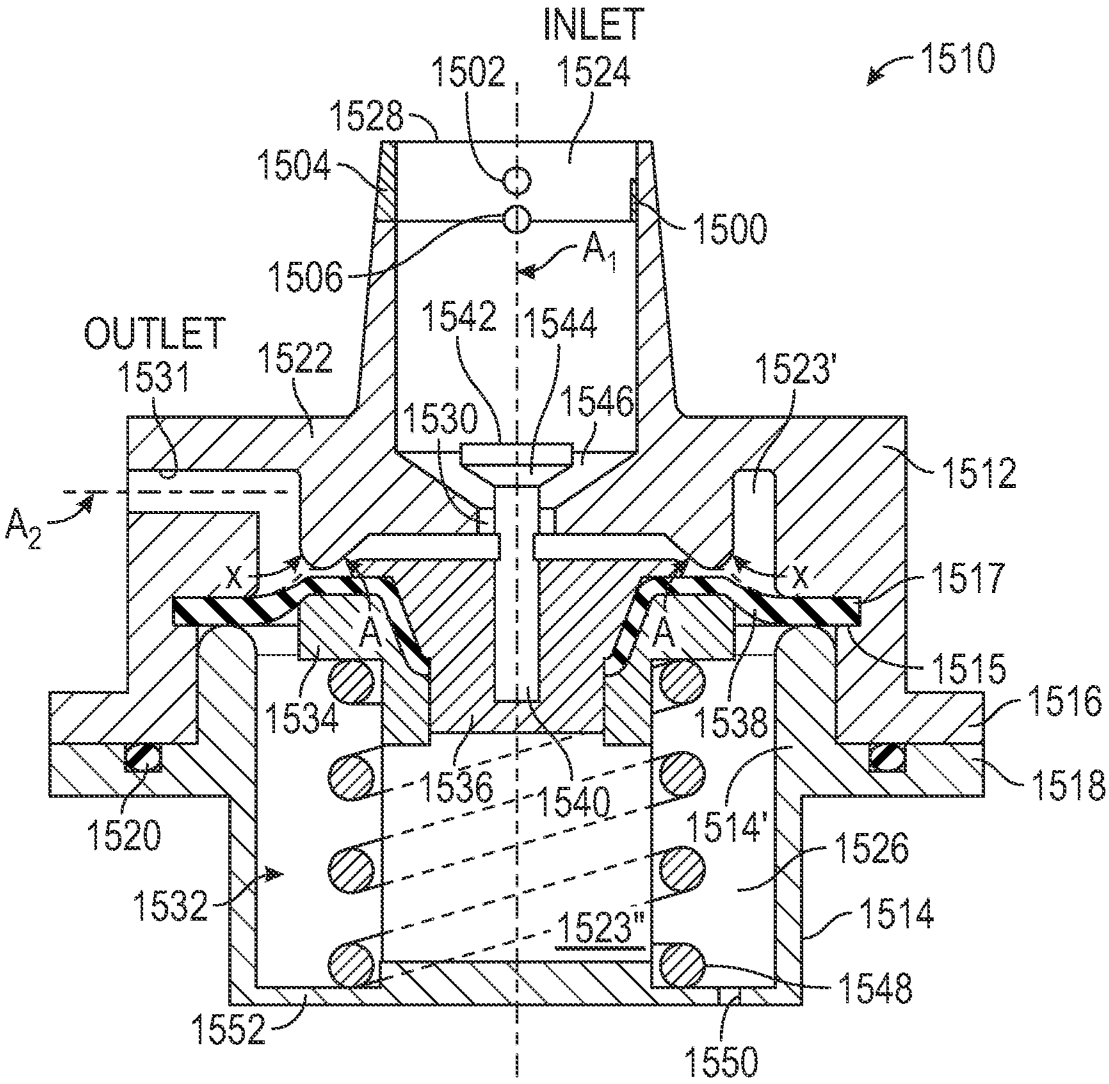

FIGS. 15-16 are illustrations of a CF Valve, according to various embodiments. With reference to FIGS. 15-16, a regulating valve in accordance with the present disclosure is generally depicted at 1510. The valve includes an outer housing having a cap 1512 joined to a cup-shaped base 1514 at mating exterior flanges 1516, 1518.

The housing is internally subdivided by a barrier wall 1522 into a head section 1524 and a base section 1526. An inlet 1528 in the cap 1512 is adapted to be connected to a fluid supply (not shown) having a pressure that can vary from below to above a threshold level. The inlet 1528 and a central port 1530 in the barrier wall 1522 are preferably aligned coaxially with a central axis A1 of the valve. An outlet port 1531 is provided in the cap 1512, and may be aligned on a second axis A2 transverse to the first axis A1. Although the axis A2 is shown at 90° with respect to axis A1, it will be understood that axis A2 may be oriented at other angles with respect to axis A1 in order to suit various applications of the valve.

A modulating assembly 1532 internally subdivides the base section into a fluid chamber 1523' segregated from a spring chamber 1523". The modulating assembly serves to prevent fluid flow through the valve when the fluid pressure at the inlet 1528 is below the threshold pressure. When the fluid pressure at the inlet exceeds the threshold pressure, the modulating assembly serves to accommodate fluid flow from the head section 1524 through port 1530 into fluid chamber 1523' and from there through outlet port 1531 at a substantially constant outlet pressure and flow rate. Either the outlet port 1531 or a downstream orifice or flow restrictor (not shown) serves to develop a back pressure in fluid chamber 1523'.

The modulating assembly 1532 includes a piston comprised of a hollow shell 1534 and a central plug 1536. The piston is supported for movement in opposite directions along axis A1 by a flexible annular diaphragm 1538. The inner periphery of the diaphragm is captured between the shell 1534 and plug 1536. The cup shaped base 1514 has a cylindrical wall segment 1514' received within the cap 1512. The outer periphery of the diaphragm is captured between an upper rim 1515 of the wall segment 1514' and an inwardly projecting interior ledge 1517 on the cap. The outer periphery of the diaphragm thus serves as an effective seal between the cap 1512 and base 1514.

A stem 1540 on the piston plug 1536 projects through the port 1530 into the head section 1524. An enlarged head 1542 on the stem has a tapered underside 1544 that coacts with a tapered surface 1546 of the barrier wall to modulate the size of the flow path through the port 1530 as an inverse function of the varying fluid pressure in the input section, with the result being to deliver fluid to the outlet 1531 at a substantially constant pressure and flow rate.

A compression spring 1548 in the spring chamber 1523" is captured between an underside surface of shell 1534 and the bottom wall 1552 of the housing base 1514. The spring urges the modulating assembly 1532 towards the barrier wall 1522. When the fluid inlet pressure is below the threshold pressure, spring 1548 serves to urge the diaphragm 1538 against a sealing ring 1549 on the underside of the barrier wall 1522, thus preventing fluid through flow from the head section 1524 via port 1530 and fluid chamber 1523' to the outlet 1531. As the fluid inlet pressure exceeds the threshold pressure, the resilient closure force of spring 1548 is overcome, allowing the modulating assembly to move away from the sealing ring 1549, and allowing the modulating function of the coacting tapered surfaces 1544, 1546 to commence. An opening 1550 in the bottom wall 1552 serves to vent the volume beneath diaphragm 1538 to the surrounding atmosphere.

In one embodiment, a dispensing device includes: a valve with an inlet area, a throttle pin coupled to the inlet area, a diaphragm, a support structure, a spring, and an outlet area; a toggle configured to open and seal the outlet area based on a position of the toggle; and where the diaphragm and the support structure are configured to generate an open state and a closed state based on a threshold pressure in the inlet area.

In another example, the dispensing device further includes a lever coupled to the toggle, the lever moves the toggle based on a position of the lever. In another example, the dispensing device further includes a spring moves the lever to a default position. In another example, the default position is a non-dispensing position. In another example, the dispensing device further includes a solenoid coupled to the toggle. In another example, the solenoid has a failed condition where the failed condition is a non-dispensing position. In another example, the dispensing device further includes a magnet coupled to the toggle. In another example, the magnet moves a blocking device based on a toggle position. In another example, the blocking device generates a first condition and a second condition based on the toggle position. In another example, the first condition is a dispensing mode and the second condition is a non-dispensing mode. In another example, the dispensing device further includes a water line and an element line.

In another embodiment, a dispensing device includes: an element side; a water side; a diaphragm located between the element side and the water side; an element throttle pin; a water throttle pin; and a structure coupled to the element throttle pin and the water throttle pin.

In another example, the structure moves towards the water throttle pin based on an element side pressure being more than a water side pressure. In another example, the structure moves towards the element throttle pin based on a water side pressure being more than an element side pressure. In another example, the diaphragm is coupled to the structure.

In another embodiment a dispensing system includes: a housing; a water line; one or more element lines; a CF Valve coupled to the water line and the one or more element lines; a toggle coupled to the CF Valve; and a lever coupled to the toggle.

In another example, the dispensing system further includes a diffuser. In another example, the dispensing system further includes an actuator coupled to the toggle. In another example, the actuator determines one or more product data or sales data based on toggle data or toggle usage. In another example, the dispensing system further includes a lever spring.

Existing systems for cleaning beverage, ice cream, ovens and other food equipment are very reliant on labor and efficacy of the cleaning can be impacted by the employee's calculation of dilution factor, remembering/choosing to run the daily, hourly and weekly cleaning cycles. This is subject to serious error and with increased focus on cleaning for quality and safety and with increased awareness by recent global events—restaurants, convenient stores, fast food, institutional purveyors and regulators need better guarantees that equipment is being cleaned appropriately and to the standards require.

Additionally, there is an opportunity for much improved environmental impact and business system impact by providing high and ultra-high ratio concentrates that are diluted on demand reducing package size, shipping size and frequency and dramatically reducing the carbon footprint and costs of delivering cleaning, sanitizing, descaling and other concentrates.

In an existing bucket and pump system measured chemicals are poured into bucket and filled with water to correct level mark on bucket and stir to mix. This bucket is then carried to the front of machine and pump through to sanitize. There are many chances for error in measurement of chemical and/or water in this procedure. Further skin contact of chemicals, carry bucket/spills etc. is problematic. In addition to a ratio control problem, there is a time issue and quality control issues. For example, time between cleaning, as well as time for solution to be present in plumbing to be effective. Furthermore, employee may just skip doing it as it is difficult to do especially in a crowded store. Another issues, is inconsistences on when and how the device is cleaned. For example, a first employee may clean the system at the appropriate time but not at the appropriate ratios. A second employee may not clean the system at all. While, a third employee may clean the system at the appropriate times with the appropriate ratio. In another system, a ChemStation type—fill bucket with chemicals and water each by weight has the same issues noted above. In another example, an Ecolab type may be done by filling a bucket by timed run of peristaltic pump has the same issues noted above. In addition, weekly service to "top off" large storage tank containing a mixed solution—gravity feed to bucket has the same issues noted above.

A Clean in Place method of sanitation that is internal to the machine being cleaned. One or more Ultra High Ratio canisters of concentrated chemical cleaning liquid may be calibrated to perform the cleaning cycle for a period weeks or months without having to be replaced. The canisters are mounter internal to the machine, plumbed into the machine's water supply source to be cycled on and off as necessary by the machines computer system. When the sealed, single use, canister is empty the machine may stop serving until the empty canister[s] is disconnected at the dry break and is replaced with a new cartridge.

Note the same clean in place system can be situated beside, behind, beneath the machine or even in the backroom of the facility. It can be automatically run by its own controller/computer/timer in the same way the internal-inside machine is run.

One example is a double bag design. The canister may be constructed with a double bag inside a ridged body if there is a chemical compatibility. The interior bag contains the cleaning chemicals and intern is contained in outer bag. The water to supply the pressure and to mix with the solution is fed in between the two bags and expands outward to be contained by the outer ridged body. There is a vent in the ridged body to allow the air to escape as the bag is filled. The benefit of the double bag system is that there is a vacuum between the two bags and there is no change of air being compressed changing the ratio of the concentrate to water mixture.

Another example is a single bag design. The single bag design uses a bag inside a ridged canister. The water supply fills the canister and compresses the bag.

The canister may be assembled with all components built into the cap—check valves, mixing chamber, orifice, etc. This makes for simple assembly and reduced costs (this is different than the current UHR design). Additionally, there may be dry breaks in the canister that allow for a dry/quick connect on the inlet water and the diluted outbound solution. This is an advantage for when the canister is replaced when it is empty. The inlet and outlet dole feature is designed so that it can be placed at any angle to accommodate where it resides in the machine. Dole fittings would allow a universal installation as the supply/discharge would be in any direction.

A system can have single or multiple canisters to allow for different chemicals (i.e.: cleaner, sanitizer, descaler) and also to have multiple different cycles utilizing one or more of the chemicals for varying different lengths of time as needed to clean for different products (i.e.: coffee, milk, juice, ice cream, steam oven, etc.) Multiple canisters would be an advantage because the cleaning for different products [juice or milk] may require a different chemical or a different time to flush.

All of the cycles are controlled either through the controller of the existing equipment or by an external controller/computer built into the CF VALVE-UHR-CIP kit. For example, a smoothie machine may run 4 hour sanitation, daily clean (short) and weekly clean (long) cycles. The built in system will shut down the machine every four hours and run the four hour cycle, and once a day to run the daily cycle and then once a week for the weekly cycle. The machine will be in operable during the cleaning cycle and will automatically be flushed with clean water after the cycle. Furthermore, there is a Total Dissolved Solids meter and/or sensors that measures the dissolved solids in the city water and then the dissolved solids in the mixed chemical. This will tell the system (whether internal or external) whether the chemical amount is on target and will provide a sold out feature to notify of chemical replacement. Also, the “sold out” feature can be utilized to shut down the entire machine so there is no way for an employee to allow a “dirty” machine to dispense/cook/mix product.

The canisters can be designed to be single use or recyclable. However, they are designed to be plug and play to the system (again through the dry break connections). The dry break connections are “pokey-oked” so that the operator/employee can NOT connect the inlet to the outlet in error and can NOT connect the wrong chemical cartridge to the wrong inlet/outlet port (i.e.: cleaner to the sanitizer port).

The design of the orifice tube connection to the bag and to the manifold provides a streamline approach that doesn’t allow kinking or compression in the canister.

Because the inlet water is controlled by an electronically actuated CF Valve it provides a constant pressure and ability to electronically actuate based on time of day and length of desired clean. Furthermore the addition of the CFiVe for the flush and TDS circuit allows the system to be automatically flushed after use and fore (or force) the TDS sensor to take a baseline water dissolved solids reading to apply the Delta calculation to ensure the proper dilution/strength of the chemical and sold out feature.

In light of the foregoing, it will now be appreciated by those skilled in the art that the present disclosure embodies a number of significant advantages, the foremost being the automatic pressure responsive control of fluid flow between a variable pressure source and an applicator from which the fluid is to be applied in a substantially uniform manner. The regulating valve is designed for low cost mass production, having a minimum number of component parts, the majority of which can be precision molded and automatically assembled.

In one example, a regulating valve for maintaining a substantially constant flow of fluid from a variable pressure fluid supply to a fluid outlet includes: a housing having axially aligned inlet and outlet ports adapted to be connected respectively to the fluid supply and the fluid outlet, and a diaphragm chamber interposed between the inlet and outlet ports, the inlet port being separated from the diaphragm chamber by a barrier wall, the barrier wall having a first passageway extending there through from an inner side facing the diaphragm chamber to an outer side facing the inlet port; a cup contained within the diaphragm chamber, the cup having a cylindrical side wall extending from a bottom wall facing the outlet port to a circular rim surrounding an open mouth facing the inner side of the barrier wall, the cylindrical side and bottom walls of the cup being spaced inwardly from adjacent interior surfaces of the housing to define a second passageway connecting the diaphragm chamber to the outlet port; a resilient disc-shaped diaphragm closing the open mouth of the cup, the diaphragm being axially supported exclusively by the circular rim and having a peripheral flange overlapping the cylindrical side wall; a piston assembly secured to the center of the diaphragm, the piston assembly having a cap on one side of the diaphragm facing the inner side of the barrier wall, and a base suspended from the opposite side of the diaphragm and projecting into the interior of the cup; a stem projecting from the cap through the first passageway in the barrier wall to terminate in a valve head, the valve head and the outer side of the barrier wall being configured to define a control orifice connecting the inlet port to the diaphragm chamber via the first passageway; and a spring in the cup coacting with the base of the piston assembly for resiliently urging the diaphragm into a closed position against the inner side of the barrier wall to thereby prevent fluid flow from the inlet port via the first passageway into the diaphragm chamber; and the spring being responsive to fluid pressure above a predetermined level applied to the diaphragm via the inlet port and the first passageway by resiliently accommodating movement of the diaphragm away from the inner side of the barrier wall, with the valve head on the stem being correspondingly moved to adjust the size of the control orifice, thereby maintaining a substantially constant flow of fluid from the inlet port through the first and second passageways to the outlet port for delivery to the fluid outlet.

In another example, a regulating valve for controlling the flow of fluid from a variable pressure fluid supply to a fluid outlet includes: a housing having axially aligned inlet and outlet ports adapted to be connected respectively to the fluid supply and the fluid outlet, and a diaphragm chamber interposed between the inlet and outlet ports, the inlet port being separated from the diaphragm chamber by a barrier wall, the barrier wall having a first passageway extending there through from an inner side facing the diaphragm chamber to an outer side facing the inlet port; a cup contained within the diaphragm chamber, the cup having a cylindrical side wall extending from a bottom wall facing the outlet port to a circular rim surrounding an open mouth facing the inner side of the barrier wall, the cylindrical side and bottom walls of the cup being spaced inwardly from adjacent interior surfaces of the housing to define a second passageway connecting the diaphragm chamber to the outlet port; a resilient disc-shaped diaphragm closing the open mouth of the cup, the diaphragm being supported exclusively by the circular rim and having a peripheral flange overlapping the cylindrical side wall; a piston assembly secured to the center of the diaphragm, the piston assembly having a base projecting into the interior of the cup; a spring in the cup coacting with the base of the piston assembly for resiliently urging the diaphragm into a closed position against the inner side of the barrier wall to thereby prevent fluid flow from the inlet port via the first passageway into the diaphragm chamber; and the spring being responsive to fluid pressure above a predetermined level applied to the diaphragm via the inlet port and the first passageway by resiliently accommodating movement of the diaphragm away from the inner side of the barrier wall, thereby accommodating a flow of fluid from the inlet port through the first and second passageways to the outlet port for delivery to the fluid outlet.

In another example, the control orifice is defined by frusto conical surfaces on the valve head and the outer side of the barrier wall. In another example, the cross sectional area of the control orifice is less than the cross sectional area of the first passageway throughout the range of movement of the valve head in response to fluid pressure applied to the diaphragm. In another example, the regulating valve further includes a vent passageway leading from the interior of the cup to the exterior of the housing. In another example, the housing is exteriorly provided with a deflecting surface adjacent to the outlet of the vent passageway, the deflecting surface being configured and arranged to direct fluid escaping from the interior of the cup in the general direction of fluid flowing through the valve, but angularly away from the valve axis. In another example, the base of the piston assembly is spaced from the bottom wall of the cup by an open gap, and wherein the spring means comprises a coiled spring bridging the gap and in contact at its opposite ends with the bottom wall and the base. In another example, the piston assembly is centered within the cup solely by the resilient support provided by the diaphragm. In another example, the housing is comprised of mating plastic inlet and outlet sections, the sections being formed by injection molding and being permanently assembled one to the other by sonic welding. In another example, the cap and base of the piston assembly are each injection molded of plastic and joined one to the other by sonic welding, with a central portion of the diaphragm held there between.

In one example, a dispensing device includes a valve configured to interact with an inlet stream, the inlet stream having a first pressure, the valve having an outlet area with an outlet stream, the outlet stream having a second pressure, and a solenoid which interacts with the outlet stream. In addition, the dispensing device may have: at least one of the inlet stream and the outlet stream being a carbonated water; the first pressure is greater than the second pressure; a size of the solenoid is reduced based on a reduction in pressure from the first pressure to the second pressure; a size of the solenoid is reduced based on the valve; the inlet stream is a utility line; the orifice is fixed; the orifice is adjustable; the orifices are both fixed and adjustable; and the valve is a CF Valve. The CF Valve is a regulating valve for maintaining a substantially constant flow of fluid from a variable pressure fluid supply to a fluid outlet, the CF Valve may including one or more of: a) a housing having axially aligned inlet and outlet ports adapted to be connected respectively to the variable fluid supply and the fluid outlet; b) a diaphragm chamber interposed between the inlet and the outlet ports, the inlet port being separated from the diaphragm chamber by a barrier wall, the barrier wall having a first passageway extending there through from an inner side facing the diaphragm chamber to an outer side facing the inlet port; c) a cup contained within the diaphragm chamber, the cup having a cylindrical side wall extending from a bottom wall facing the outlet port to a circular rim surrounding an open mouth facing the inner side of the barrier wall, the cylindrical side and bottom walls of the cup being spaced inwardly from adjacent interior surfaces of the housing to define a second passageway connecting the diaphragm chamber to the outlet port; d) a resilient disc-shaped diaphragm closing the open mouth of the cup, the diaphragm being axially supported by the circular rim and having a peripheral flange overlapping the cylindrical side wall; e) a piston assembly secured to the center of the diaphragm, the piston assembly having a cap on one side of the diaphragm facing the inner side of the barrier wall, and a base suspended from the opposite side of the diaphragm and projecting into the interior of the cup; f) a stem projecting from the cap through the first passageway in the barrier wall to terminate in a valve head, the valve head and the outer side of the barrier wall being configured to define a control orifice connecting the inlet port to the diaphragm chamber via the first passageway; and g) a spring device in the cup coacting with the base of the piston assembly for resiliently urging the diaphragm into a closed position against the inner side of the barrier wall to thereby prevent fluid flow from the inlet port via the first passageway into the diaphragm chamber, the spring device being responsive to fluid pressure above a predetermined level applied to the diaphragm via the inlet port and the first passageway by accommodating movement of the diaphragm away from the inner side of the barrier wall, with the valve head on the stem being moved to adjust the size of the control orifice, thereby maintaining a constant flow of fluid from the inlet port through the first and second passageways to the outlet port for delivery to the fluid outlet.

In another example, the dispensing device may further include: a dispensing unit including one or more flavor units and one or more water units where each of the one or more flavor units include a transportation unit, the transportation unit including a barrier element with one or more openings; a blockage device configured to close the one or more openings to prevent a flow from at least one of the one or more flavor units; and/or a movement device configured to move the blockage device to a first position relative to the one or more openings which allows for a passage of one or more fluid elements and one gaseous elements through the one or more openings in the blockage device.

The dispensing device may further include a carbonated unit. In another example, the movement device is a magnet. In another example, the movement device is an electromagnet. In another example, the dispensing device may have at least one of the one or more flavor units may be selectable. In addition, the at least one of the one or more flavor units may be automatically selectable.

In one embodiment, the cartridge includes: a body with a first groove and a second groove, the body including a body inlet area and a body outlet area; an O-ring coupled to body via the first groove; a throttle pin coupled to the inlet area; a spring cap with a groove area, a spring cap inlet area, and a spring cap outlet area; a spring cap O-ring coupled to the spring cap via the groove area; a spring coupled to a bottom retainer; a diaphragm coupled to the bottom retainer; and a top retainer coupled to the diaphragm.

In addition, the cartridge may be configured to be inserted into a device. Further, the cartridge may be configured to be inserted into an existing device where the existing device has one or more inlet ports and outlet ports in any locations on the existing device. In addition, a cartridge inlet area and a cartridge outlet area may be in series with each other. Further, a cartridge inlet area and a cartridge outlet area may be at a 90 degree angle to each other (and/or any other angle and/or any other angle disclosed and/or shown in this document). In addition, the body may include a 360 degree outlet passage. Further, the spring cap may be configured to create a seal by compressing the diaphragm to the body. Further, the cartridge may include a CF Valve.

In another embodiment, a movement system includes: a cartridge with a cartridge inlet area and a cartridge outlet area; a housing with a housing inlet area and a housing outlet area; wherein the cartridge transfers at least one or more gases and one or more liquids from the housing inlet area to the housing outlet area independent of a relative position of the cartridge inlet area to the housing inlet area and the cartridge outlet area to the housing outlet area. In addition, the cartridge may include a body with a first groove, a body inlet area, and a body outlet area. In addition, the cartridge may include an O-ring coupled to body via the first groove. Further, the cartridge may include a throttle pin coupled to the inlet area. In addition, the cartridge may include a spring cap with a groove area, a spring cap inlet area, a spring cap outlet area, and a spring cap O-ring coupled to the spring cap via the groove area. Further, the cartridge may include a spring coupled to a bottom retainer. Further, the cartridge may include a diaphragm coupled to the bottom retainer. In addition, the cartridge may include a top retainer coupled to the diaphragm. In addition, the cartridge may include a CF Valve.

In another embodiment, a cartridge includes: a body with a first groove and a second groove, the body including a body inlet area and a body outlet area; an O-ring coupled to body via the first groove; a throttle pin including a pin and a pinhead coupled to the inlet area; a spring cap with a groove area, a spring cap inlet area, and a spring cap outlet area; a spring cap O-ring coupled to the spring cap via the groove area; a spring coupled to a bottom retainer; a diaphragm coupled to the bottom retainer; and a top retainer coupled to the diaphragm. In addition, the at least one of the pin and the pinhead may have a ratio of greater than 1 to the body. Further, the at least one of the pin and the pinhead may have a ratio of less than 1 to the body. In addition, the cartridge may be configured to be inserted into a device. Further, the cartridge may be configured to be inserted into an existing device where the existing device has one or more inlet ports and outlet ports in any locations on the existing device.

In one embodiment, a cleaning system for a drink dispensing device includes: a cleaner canister coupled to a water source; a cleaner CF Valve coupled to the water source which provides a first water flow to the cleaner canister. The cleaner canister may provide a cleaner solution to one or more parts of the drink dispensing device.

In another example, the cleaning system may include a sanitizer canister coupled to the water source and a sanitizer CF Valve coupled to the water source which provides a second water flow to the sanitizer canister. The sanitizer canister may provide a sanitizer solution to one or more parts of the drink dispensing device. In another example, the cleaning system may include a water flush device coupled to the water source and a water flush CF Valve coupled to the water source which provides a third water flow to the one or more parts of the drink dispensing device.

In another example, the cleaning system may include an inlet dry breaking fitting and an outlet dry breaking fitting on the sanitizer canister. In another example, the cleaning system may include an inlet dry breaking fitting and an outlet dry breaking fitting on the cleaner canister. In another example, the cleaning system may include a total dissolved solids device which measures an inlet total dissolved solids and an outlet total dissolved solids. In another example, the cleaning system may include a sanitizer canister coupled to the water source and a sanitizer CF Valve coupled to the water source which provides a second water flow to the sanitizer canister. The sanitizer canister may provide a sanitizer solution to one or more parts of the drink dispensing device. A water flush device coupled to the water source and a water flush CF Valve coupled to the water source which provides a third water flow to the one or more parts of the drink dispensing device. A total dissolved solids device which measures an inlet total dissolved solids and an outlet total dissolved solids. In another example, the cleaning system may include a sanitizer canister coupled to the water source and a sanitizer CF Valve coupled to the water source which provides a second water flow to the sanitizer canister. The sanitizer canister may provide a sanitizer solution to one or more parts of the drink dispensing device; a water flush device coupled to the water source and a water flush CF Valve coupled to the water source which provides a third water flow to the one or more parts of the drink dispensing device. A total dissolved solids device which measures an inlet total dissolved solids and an outlet total dissolved solids. An inlet dry breaking fitting and an outlet dry breaking fitting on the sanitizer canister. An inlet dry breaking fitting and an outlet dry breaking fitting on the cleaner canister. A controller that controls one or more ratios based on the inlet total dissolved solids and the outlet total dissolved solids. In another example, one or more of the cleaner CF Valve, the sanitizer CF Valve, and the water flush CF Valve may maintain a relative constant flow of fluid from a variable pressure fluid supply to a fluid outlet, the CF Valve including: a) a valve housing having an inlet port and an outlet port adapted to be connected to the variable pressure fluid supply and the fluid outlet; b) a diaphragm chamber interposed between the inlet port and the outlet port; c) a cup contained within the diaphragm chamber; d) a diaphragm closing the cup; e) a piston assembly secured to a center of the diaphragm, the piston assembly having a cap and a base; f) a stem projecting from the cap through a first passageway in a barrier wall to terminate in a valve head; and g) a spring in the cup coacting with the base of the piston assembly for urging the diaphragm into a closed position, and the spring being responsive to fluid pressure above a predetermined level to adjust a size of a control orifice. In another example, one or more of the cleaner CF Valve, the sanitizer CF Valve, and the water flush CF Valve is configured to maintain a relative constant flow of fluid from a variable pressure fluid supply to a fluid outlet, the CF Valve including: a base having a wall segment terminating in an upper rim, and a projecting first flange; a cap having a projecting ledge and a projecting second flange, the wall segment of the base being located inside the cap with a space between the upper rim of the base and the projecting ledge of the cap; a barrier wall subdividing an interior of a housing into a head section and a base section; a modulating assembly subdividing the base section into a fluid chamber and a spring chamber; an inlet in the cap for connecting the head section to a fluid source; a port in the barrier wall connecting the head section to the fluid chamber, the port being aligned with a central first axis of the CF Valve; an outlet in the cap communicating with the fluid chamber, the outlet being aligned on a second axis transverse to the first axis; a stem projecting from the modulating assembly along the first axis through the port into the head section; a diaphragm supporting the modulating assembly within the housing for movement in opposite directions along the first axis, a spring in the spring chamber, the spring being arranged to urge the modulating assembly into a closed position at which the diaphragm is in sealing contact with the barrier wall, and the spring being responsive to fluid pressure above a predetermined level to adjust a size of a control orifice.

In another embodiment, a cap for a canister may include: a CF Valve coupled to a cleaning solution source; a tube coupled to the CF Valve to transport a cleaning solution; and a tube outlet area to deliver the cleaning solution.

In another example, the tube has a first length and the delivered cleaning solution has a first cleaning solution concentration based on the first length. In another example, the tube has a second length and the delivered cleaning solution has a second cleaning solution concentration based on the second length. In another example, a second tube that has a second length and the delivered cleaning solution has a second cleaning solution concentration based on the second length and wherein the tube has a first length and the delivered cleaning solution has a first cleaning solution concentration based on the first length and wherein the first cleaning solution concentration is different than the second cleaning solution concentration.

In another embodiment, a canister may include: a body with an inlet and an outlet; a cap including a mixing chamber, one or more orifices, and one or more check valves; the inlet coupled to the cap, a CF Valve, and a first total dissolved solids sensor; and the outlet coupled to the cap and a second total dissolved solids sensor, the outlet may deliver a flow from the canister.

In another example, the flow from the canister is modified based on data delivered to a controller from at least one of the first total dissolved solids sensor and the second total dissolved solids sensor. In another example, the canister may include a tube with a first length from the CF Valve to the outlet where a concentrate of the flow is determined by the first length. In another example, the CF Valve may maintain a relative constant flow of fluid from a variable pressure fluid supply to a fluid outlet, the CF Valve including: a) a valve housing having an inlet port and an outlet port adapted to be connected to the variable pressure fluid supply and the fluid outlet; b) a diaphragm chamber interposed between the inlet port and the outlet port; c) a cup contained within the diaphragm chamber; d) a diaphragm closing the cup; e) a piston assembly secured to a center of the diaphragm, the piston assembly having a cap and a base; f) a stem projecting from the cap through a first passageway in a barrier wall to terminate in a valve head; and g) a spring in the cup coacting with the base of the piston assembly for urging the diaphragm into a closed position, and the spring being responsive to fluid pressure above a predetermined level to adjust a size of a control orifice. In another example, the CF Valve is configured to maintain a relative constant flow of fluid from a variable pressure fluid supply to a fluid outlet, the CF Valve including: a base having a wall segment terminating in an upper rim, and a projecting first flange; a cap having a projecting ledge and a projecting second flange, the wall segment of the base being located inside the cap with a space between the upper rim of the base and the projecting ledge of the cap; a barrier wall subdividing an interior of a housing into a head section and a base section; a modulating assembly subdividing the base section into a fluid chamber and a spring chamber; an inlet in the cap for connecting the head section to a fluid source; a port in the barrier wall connecting the head section to the fluid chamber, the port being aligned with a central first axis of the CF Valve; an outlet in the cap communicating with the fluid chamber, the outlet being aligned on a second axis transverse to the first axis; a stem projecting from the modulating assembly along the first axis through the port into the head section; a diaphragm supporting the modulating assembly within the housing for movement in opposite directions along the first axis, a spring in the spring chamber, the spring being arranged to urge the modulating assembly into a closed position at which the diaphragm is in sealing contact with the barrier wall, and the spring being responsive to fluid pressure above a predetermined level to adjust a size of a control orifice.

In another example, the canister may be coupled to a drink dispensing system for one or more cleaning procedures.

As used herein, the term "mobile device" refers to a device that may from time to time have a position that changes. Such changes in position may comprise of changes to direction, distance, and/or orientation. In particular examples, a mobile device may comprise of a cellular telephone, wireless communication device, user equipment, laptop computer, other personal communication system ("PCS") device, personal digital assistant ("PDA"), personal audio device ("PAD"), portable navigational device, or other portable communication device. A mobile device may also comprise of a processor or computing platform adapted to perform functions controlled by machine-readable instructions.

The methods and/or methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or a special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the arts to convey the substance of their work to others skilled in the art. An algorithm is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference throughout this specification to "one example," "an example," "embodiment," and/or "another example"

should be considered to mean that the particular features, structures, or characteristics may be combined in one or more examples. Any combination of any element in this disclosure with any other element in this disclosure is hereby disclosed. For example, an element on pages 5-6 can be combined with any element in this document (e.g., an element from pages 23-26).

While there has been illustrated and described what are presently considered to be example features, it will be understood by those skilled in the art that various other modifications may be made, and equivalents may be substituted, without departing from the disclosed subject matter. Additionally, many modifications may be made to adapt a particular situation to the teachings of the disclosed subject matter without departing from the central concept described herein. Therefore, it is intended that the disclosed subject matter not be limited to the particular examples disclosed.

The invention claimed is:

1. A dispensing device comprising:

a valve with an inlet area, a throttle pin coupled to the inlet area, a diaphragm, a support structure, a spring, and an outlet area;

a toggle configured to open and seal the outlet area based on a position of the toggle;

the diaphragm and the support structure are configured to generate an open state and a closed state based on a threshold pressure in the inlet area; and the toggle configured to generate via one or more commands from one or more processors a first open time period based on recipe information received by the one or more processors.

2. The dispensing device of claim 1, further comprising a lever coupled to the toggle, the lever configured to move the toggle based on a position of the lever.

3. The dispensing device of claim 2, further comprising a spring configured to move the lever to a default position.

4. The dispensing device of claim 3, wherein the default position is a non-dispensing position.

5. The dispensing device of claim 1, further comprising a solenoid coupled to the toggle.

6. The dispensing device of claim 5, wherein the solenoid is configured to have a failed condition, the failed condition being a non-dispensing position.

7. The dispensing device of claim 1, further comprising a magnet coupled to the toggle.

8. The dispensing device of claim 7, wherein the magnet moves a blocking device based on a toggle position.

9. The dispensing device of claim 8, wherein the blocking device generates a first condition and a second condition based on the toggle position.

10. The dispensing device of claim 9, wherein the first condition is a dispensing mode and the second condition is a non-dispensing mode.

11. The dispensing device of claim 1, further comprising a water line and a non-water line.

* * * * *